(12) United States Patent
Drolet et al.

(10) Patent No.: US 10,591,774 B2
(45) Date of Patent: Mar. 17, 2020

(54) DISPLAYS WITH COLLIMATED LIGHT SOURCES AND QUANTUM DOTS

(71) Applicant: Apple Inc., Cupertino, CA (US)

(72) Inventors: Jean-Jacques P. Drolet, San Jose, CA (US); Yuan Chen, San Jose, CA (US); Jonathan S. Steckel, Saratoga, CA (US); Ion Bita, Santa Clara, CA (US); Dmitry S. Sizov, Cupertino, CA (US); Chia Hsuan Tai, San Jose, CA (US); John T. Leonard, San Jose, CA (US); Lai Wang, Fremont, CA (US); Ove Lyngnes, Carmel Valley, CA (US); Xiaobin Xin, Sunnyvale, CA (US); Zhibing Ge, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 15/693,305

(22) Filed: Aug. 31, 2017

(65) Prior Publication Data
US 2018/0292713 A1 Oct. 11, 2018

Related U.S. Application Data

(60) Provisional application No. 62/483,606, filed on Apr. 10, 2017.

(51) Int. Cl.
*G02F 1/1335* (2006.01)
*G02F 1/1343* (2006.01)
(Continued)

(52) U.S. Cl.
CPC ........ *G02F 1/133611* (2013.01); *G02B 6/005* (2013.01); *G02B 6/0031* (2013.01);
(Continued)

(58) Field of Classification Search
CPC ......... G02F 1/133611; G02F 1/133621; G02F 1/133617; G02F 1/133514;
(Continued)

(56) References Cited

U.S. PATENT DOCUMENTS 8,174,034 B2   5/2012   Bogner et al.
8,405,063 B2   3/2013   Kazlas et al.
(Continued)

OTHER PUBLICATIONS

Talapin et al., Quantum Dot Light-Emitting Devices, MRS Bulletin, 2013, 7 pages, vol. 38.

(Continued)

*Primary Examiner* — Charles S Chang
(74) *Attorney, Agent, or Firm* — Treyz Law Group, P.C.; G. Victor Treyz; Joseph F. Guihan

(57) ABSTRACT

A display may have display layers that form an array of pixels. The display layers may include a first layer that includes a light-blocking matrix and a second layer that overlaps the first layer. The first layer may include quantum dot elements formed in openings in the light-blocking matrix. The light-blocking matrix may be formed from a reflective material such as metal. The second layer may include color filter elements that overlap corresponding quantum dot elements in the first layer. Substrate layers may be used to support the first and second layers and to support thin-film transistor circuitry that is used in controlling light transmission through the array of pixels. The display layers may include a liquid crystal layer, polarizer layers, filter layers for reflecting red and green light and/or other light to enhance light recycling, and layers with angularly dependent transmission characteristics.

20 Claims, 20 Drawing Sheets

(51) Int. Cl.
*F21V 8/00* (2006.01)
*G06F 3/044* (2006.01)
*G02F 1/1368* (2006.01)
*G02F 1/1333* (2006.01)
*G06F 3/041* (2006.01)

(52) U.S. Cl.
CPC ......... *G02B 6/0055* (2013.01); *G02B 6/0068* (2013.01); *G02B 6/0076* (2013.01); *G02F 1/133509* (2013.01); *G02F 1/133512* (2013.01); *G02F 1/133514* (2013.01); *G02F 1/133603* (2013.01); *G02F 1/133606* (2013.01); *G02F 1/133617* (2013.01); *G02F 1/133621* (2013.01); *G02F 1/134309* (2013.01); *G02B 6/004* (2013.01); *G02B 6/0066* (2013.01); *G02F 1/1368* (2013.01); *G02F 1/13338* (2013.01); *G02F 1/13439* (2013.01); *G02F 1/133536* (2013.01); *G02F 1/133605* (2013.01); *G02F 2001/133607* (2013.01); *G02F 2001/133614* (2013.01); *G02F 2201/123* (2013.01); *G02F 2202/36* (2013.01); *G02F 2203/02* (2013.01); *G02F 2203/055* (2013.01); *G06F 3/044* (2013.01); *G06F 3/0412* (2013.01)

(58) Field of Classification Search
CPC ......... G02F 1/133509; G02F 1/134309; G02F 1/133512; G02F 1/133606; G02F 1/133603; G02F 1/133536; G02F 2001/133614; G02F 2202/36; G02F 2001/133607; G02F 1/1368; G02F 2201/123; G02F 2203/055; G02F 2203/02; G02F 1/133605; G02F 1/13338; G02F 1/13439; G02F 3/0412; G02B 6/0055; G02B 6/0031; G02B 6/0076; G02B 6/005; G02B 6/0068; G02B 6/004; G02B 6/0066
USPC .......................................................... 349/71
See application file for complete search history.

(56) References Cited

U.S. PATENT DOCUMENTS

| | | | |
|---|---|---|---|
| 2010/0193806 A1* | 8/2010 | Byun | H01L 33/507 257/88 |
| 2014/0140653 A1 | 5/2014 | Brown et al. | |
| 2014/0204128 A1* | 7/2014 | Jiang | G02F 1/133617 345/690 |
| 2015/0301408 A1 | 10/2015 | Li | |
| 2015/0331278 A1* | 11/2015 | Araki | G02F 1/133617 349/61 |
| 2016/0091151 A1* | 3/2016 | Itoi | G02B 6/0068 362/612 |
| 2016/0091757 A1* | 3/2016 | Miki | G02F 1/133617 349/42 |
| 2016/0218252 A1 | 7/2016 | Steckel et al. | |
| 2016/0290600 A1 | 10/2016 | Biederman et al. | |
| 2016/0320665 A1* | 11/2016 | Cho | G02F 1/133504 |
| 2016/0335958 A1 | 11/2016 | Huang et al. | |
| 2016/0342282 A1 | 11/2016 | Wassvik | |

OTHER PUBLICATIONS

Burrows et al., Achieving Full-Color Organic Light-Emitting Devices for Lightweight, Flat-Panel Displays, IEEE Transactions on Electron Devices, Aug. 1997, p. 1188-1203, vol. 44, No. 8.

* cited by examiner

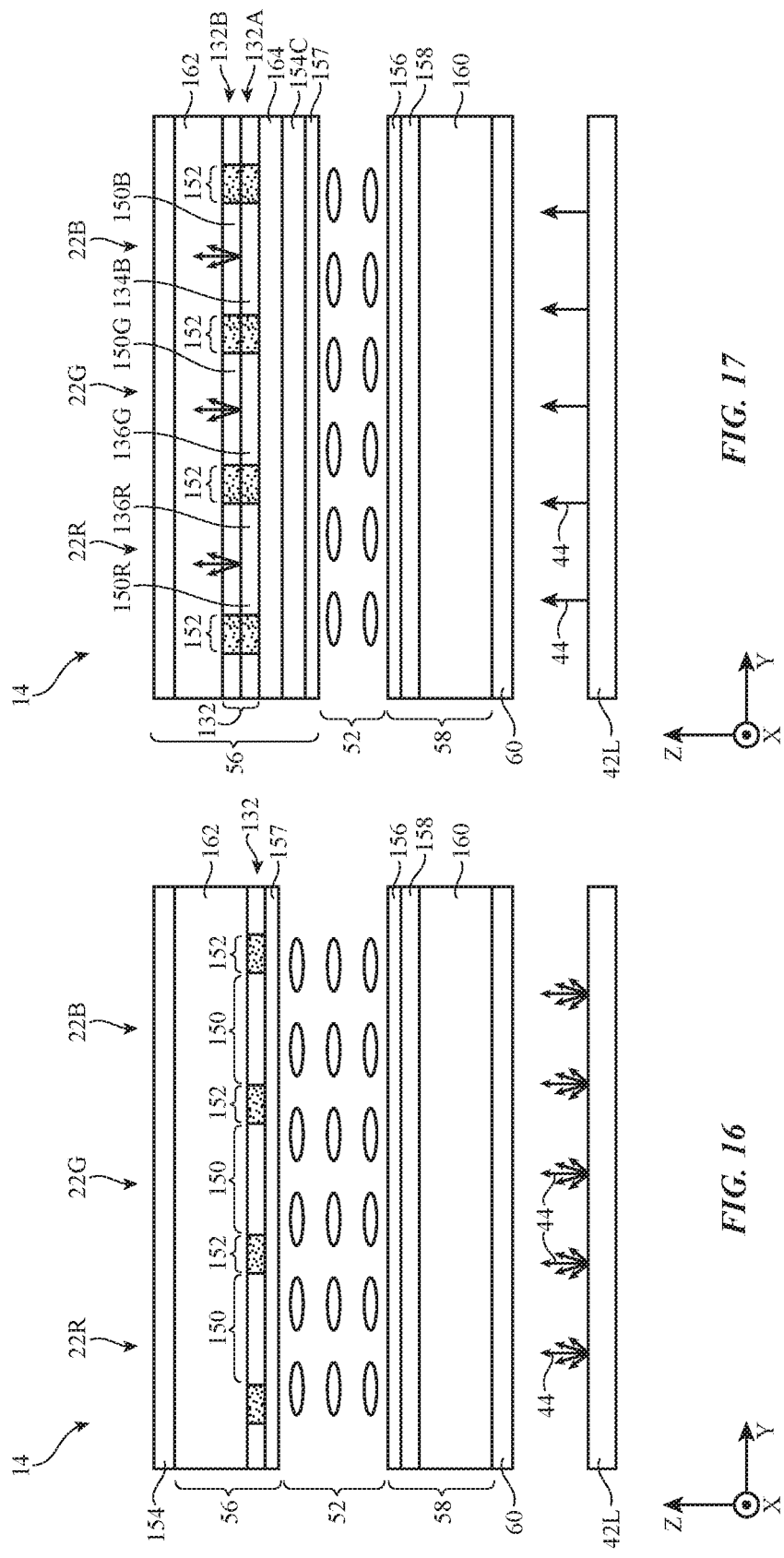

DISPLAYS WITH COLLIMATED LIGHT SOURCES AND QUANTUM DOTS

This application claims the benefit of provisional patent application No. 62/483,606, filed Apr. 10, 2017, which is hereby incorporated by reference herein in its entirety.

BACKGROUND

This relates generally to electronic devices, and, more particularly, to electronic devices with displays.

Electronic devices often include displays. Backlit displays such as backlit liquid crystal displays include backlight units. A backlight unit produces light that travels outwardly through an array of pixels in a display. The pixels modulate the intensity of the light from the backlight unit to create images on the display.

Backlight units help ensure that displays can display images in a wide variety of ambient lighting conditions. If care is not taken, however, backlight units may produce light that does not efficiently illuminate display pixels or that does not allow the display pixels to exhibit desired levels of color performance.

SUMMARY

A display may have display layers that form an array of pixels. The array of pixels may include quantum dot elements of different colors. A light source may produce pump light for the quantum dot elements. When exposed to pump light, the quantum dot elements may emit light for forming images on the display. A liquid crystal layer, thin-film transistor circuitry, and one or more polarizer layers may be used to form pixel structures in the display layer that modulate the light intensities of individual pixels.

The light source may include an edge-lit light guide or an array of cells containing individually adjustable light-emitting devices. Light-emitting devices may emit unpolarized light or light that is substantially polarized. In some configurations, light-emitting devices such as light-emitting diodes formed from semiconductor dies may be covered with a high-index-of-refraction material that forms a light-distributing waveguide structure. The high-index-of-refraction material may have a refractive index that is within 10% or other suitable amount of the refractive index of the light-emitting diodes (e.g., the semiconductor material forming the semiconductor dies). The waveguide structures may have light-redirecting structures such as gratings for redistributing light from the light-emitting diodes outwards through the pixel array. The waveguide structures may also have openings in which reflective material is formed to help distribute the light within each cell.

The display layers may include a first layer that includes a light-blocking matrix and a second layer that overlaps the first layer. The first layer may include the quantum dot elements formed in openings in the light-blocking matrix. The light-blocking matrix may be formed from a reflective material such as metal. The second layer may include color filter elements that overlap corresponding quantum dot elements in the first layer.

Substrate layers may be used to support the first and second layers and to support the thin-film transistor circuitry that is used in controlling light transmission through the array of pixels. A low-index portion of the second substrate layer may be formed from recesses in a surface of the second substrate layer that faces the first and second layers.

The display layers may include a liquid crystal layer, polarizer layers, filter layers for reflecting red and green light and/or other light while passing pump light wavelengths to enhance light recycling, and light-collimating filter layers with an angularly dependent transmission characteristic.

BRIEF DESCRIPTION OF THE DRAWINGS

FIG. 16 is a cross-sectional side view of an illustrative display having pixels with color filter elements in accordance with an embodiment.

FIG. 17 is a cross-sectional side view of an illustrative display with color filter elements and quantum dot elements of different corresponding colors for forming pixels of different respective colors in a display with a non-inverted thin-film transistor layer display configuration in accordance with an embodiment.

DETAILED DESCRIPTION

Figure 1:
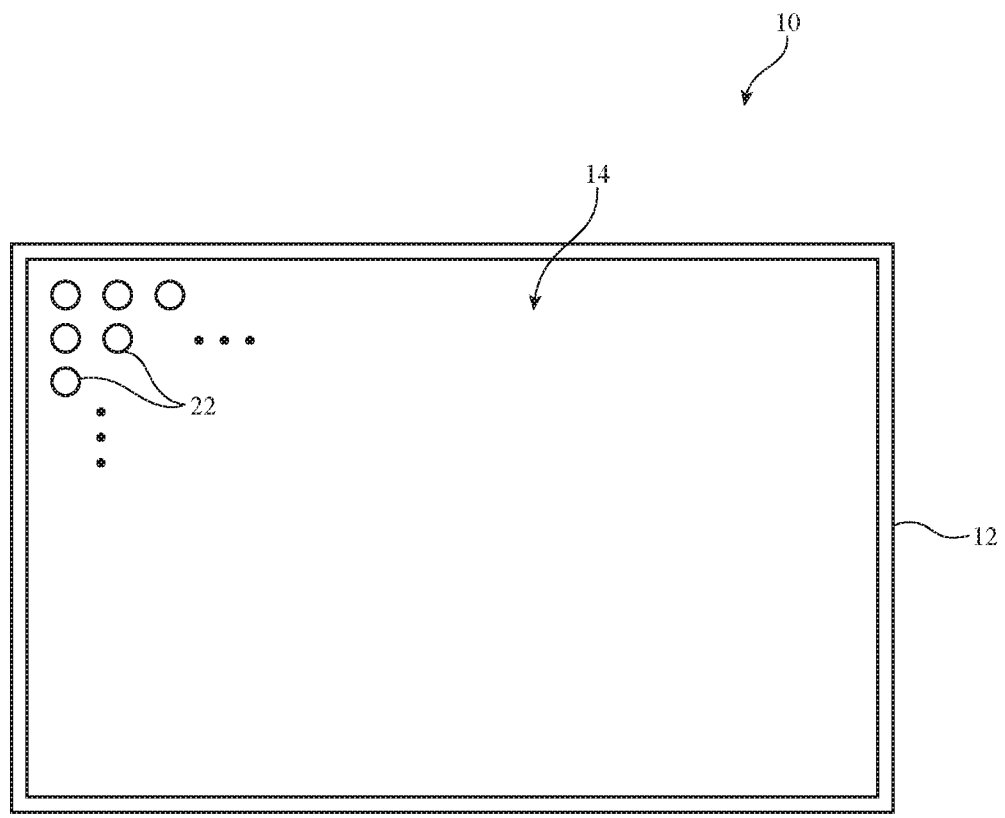
FIG. 1 is a diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include an array of pixels 22. The array of pixels 22 in display 14 may form a rectangular area or an area of other suitable shapes for displaying images for a user. Pixels 22 may be formed from liquid crystal display (LCD) components, an array of electrophoretic pixels, an array of electrowetting pixels, or pixels based on other display technologies. Configurations in which display 14 is a liquid crystal display that is illuminated by a light source are sometimes described herein as an example. Liquid crystal display pixels for display 14 may have any suitable switching configuration (e.g., fringe-field switching, vertical alignment, twisted nematic, in-plane switching, etc.). Fringe-field switching displays may exhibit reduced sensitivity to touch. Twisted neumatic designs may be helpful in arrangements in which blue light is being modulated, because the retardation of liquid crystal material tends to be greater at short wavelengths. The use of liquid crystal display technology for forming display 14 is merely illustrative. Display 14 may, in general, be formed using any suitable type of pixels.

Display 14 may be protected using a display cover layer such as a layer of transparent glass or clear plastic. Openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, etc. In some arrangements, the display cover layer for display 14 is free of openings and/or housing 12 is free of openings for buttons, etc.

Figure 2:
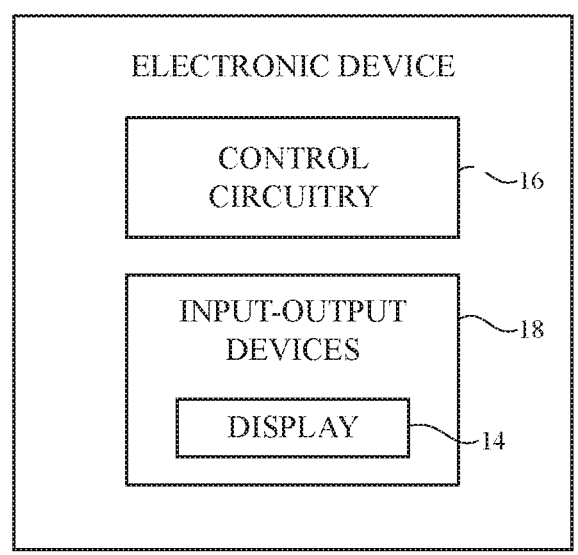
FIG. 2 is a schematic diagram of an illustrative electronic device having a display in accordance with an embodiment.

FIG. 2 is a schematic diagram of device 10. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors (e.g., ambient light sensors, proximity sensors, orientation sensors, magnetic sensors, force sensors, touch sensors, pressure sensors, fingerprint sensors, etc.), light-emitting diodes and other status indicators, data ports, etc. A user can control the operation of device 10 by supplying commands through input-output devices 18 and may receive status information and other output from device 10 using the output resources of input-output devices 18. Input-output devices 18 may include one or more displays such as display 14.

Control circuitry 16 may be used to run software on device 10 such as operating system code and applications. During operation of device 10, the software running on control circuitry 16 may display images on display 14 using an array of pixels in display 14. While displaying images, control circuitry 16 may control the transmission of each of the pixels in the array and can make adjustments to the amount of illumination for the pixel array that is being produced by light source structures in display 14.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 3:
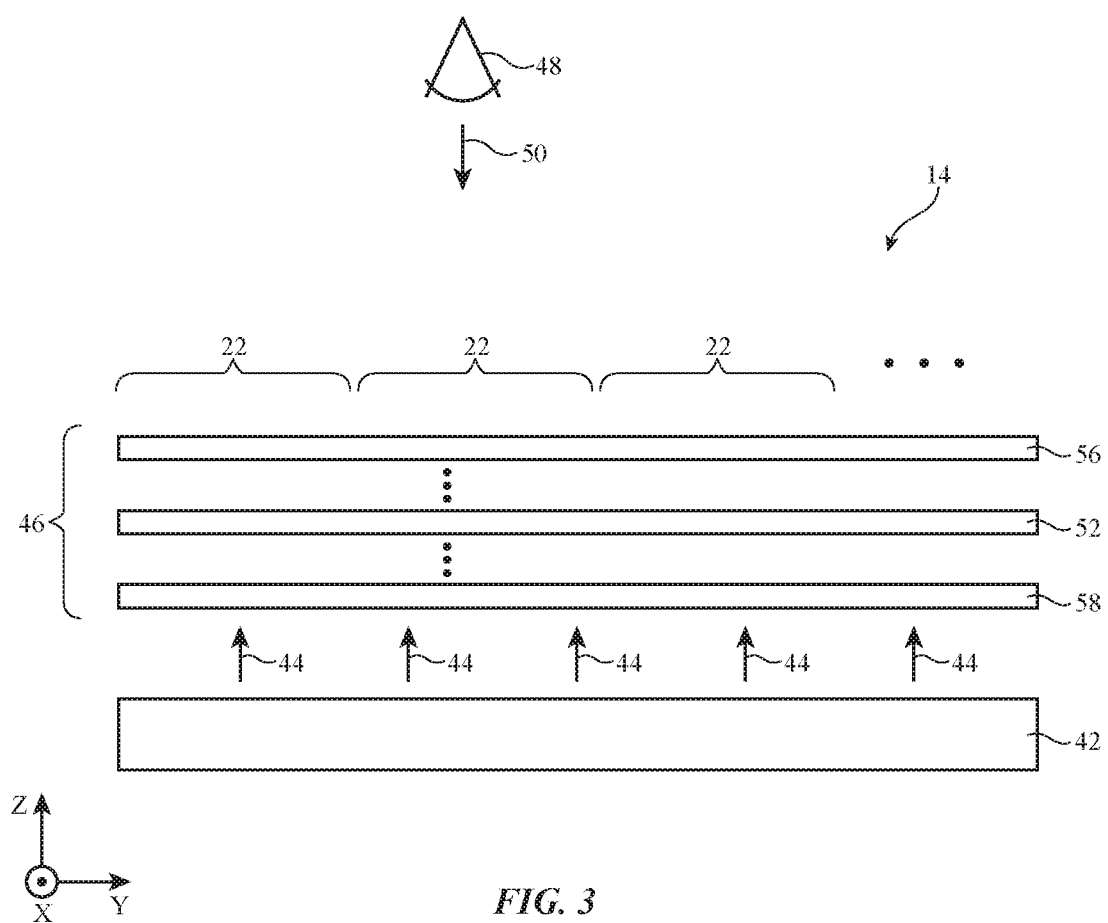
FIG. 3 is a cross-sectional side view of an illustrative display in accordance with an embodiment.

A cross-sectional side view of display 14 is shown in FIG. 3. As shown in FIG. 3, display 14 may include a light source such as light source 42. Light source 42, which may sometimes be referred to as a pump light source or backlight, may be configured to supply illumination to display layers 46 such as light 44. In some arrangements, pixels 22 include quantum dots, quantum rods, or other quantum nanoparticles that emit light at a particular color (e.g., red, green, etc.) in response to receiving pump light at a shorter wavelength (e.g., blue pump light or ultraviolet pump light). In these configurations, light 44 serves as pump light for the quantum dots (or quantum rods or other quantum nanoparticles) and structures 42 may be referred to as a source of pump light or pump light source. In other configurations, pixels 22 do not contain quantum nanoparticles. In these configurations, light 44 serves as backlight illumination and light source 42 may be referred to as a backlight unit.

As shown in FIG. 3, light 44 travels outwards (vertically upwards in dimension Z in the orientation of FIG. 3) away from light source 42 and is received by pixels 22 in display layers 46. Light 44 passes through transparent structures in pixels 22 and/or appropriately colored filter elements and/or is absorbed by quantum dots in pixels 22 and re-emitted from the quantum dots at wavelengths associated with the quantum dots (e.g., red light is emitted from red quantum dots, etc.). In this way, light 44 may help illuminate images on the pixel array formed from pixels 22 in display layers 46 so that these images may be viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a liquid crystal display, display layers 46 may include a liquid crystal layer such a liquid crystal layer 52. Liquid crystal layer 52 may be sandwiched between display layers such as display layers 58 and 56. Display 14 may also include polarizers. The polarizers may be formed from external polarizer layers (e.g., polarizer layers on the surfaces of layers 56 and 58 that face away from liquid crystal layer 52) and/or from in-cell polarizers (polarizers facing liquid crystal layer 52).

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, lower layer 58 may be a thin-film transistor layer that includes an array of pixel circuits based on thin-film transistors and associated electrodes (pixel electrodes) for applying electric fields to liquid crystal layer 52 and thereby displaying images on display 14. Upper layer 56 may be a layer that includes an array of colored pixel elements (e.g., color filter elements and/or colored quantum dot elements) for providing display 14 with the ability to display color images. If desired, the lower layer of display 14 may be a layer that includes an array of colored elements (e.g., color filter elements and/or colored quantum dot elements) and the upper layer of display 14 may be a thin-film transistor layer. Configurations in which an array of colored elements (e.g., color filter elements and/or colored quantum dot elements) are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to pixels 22 using display driver circuitry (e.g., one or more display driver integrated circuits and/or thin-film transistor circuitry) while light source 42 is providing light 44 to pixels 22.

It may be desirable to limit the angular spread of the light from pixels 22 to enhance display efficiency. Configurations in which light source 42 produces polarized light may also be helpful in enhancing display efficiency (e.g., polarizer losses can be reduced).

Figure 4:
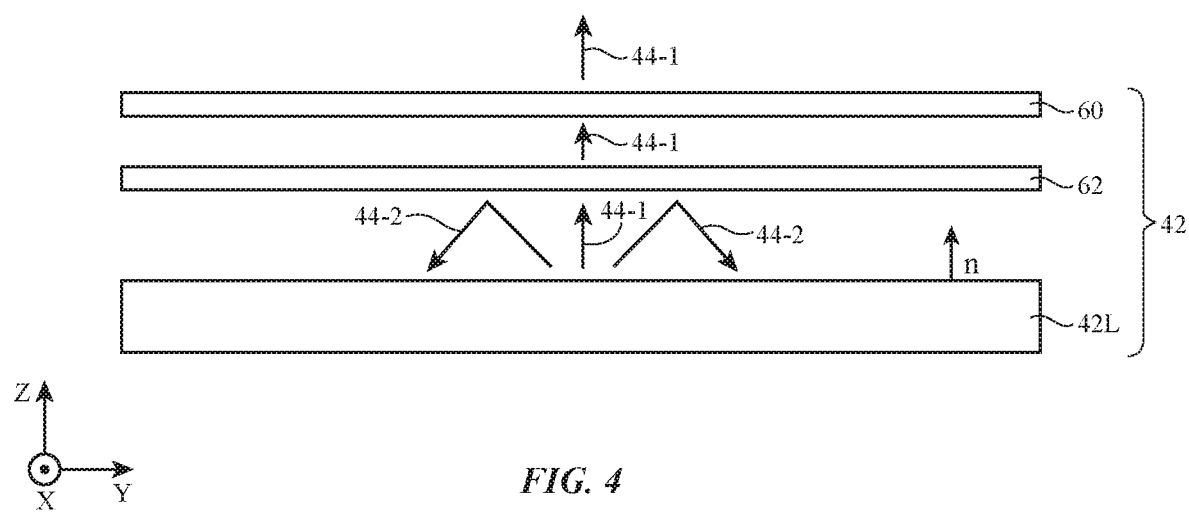
FIG. 4 is a cross-sectional side view of a light source having a filter layer with an angularly dependent transmission characteristic in accordance with an embodiment.

To help collimate light 44, light source 42 may be provided with a filter layer having an angularly dependent light transmission characteristic. As shown in FIG. 4, for example, light source 42 may have a light-emitting structure such as light-emitting structure 42L. Structure 42L may include an edge-lit light guide, may include a direct-lit backlight structure having an array of light-emitting cells (tiles) and/or may have other suitable structures for emitting light. The light that is emitted upwards by structure 42L may include light 44-1 that is aligned closely with the Z-axis of FIG. 4 (e.g., light that is aligned with surface normal n of structure 42L and the other layers of display 14). The light emitted from structure 42 may also include off-axis light 44-2 (e.g. light at a non-zero angle with respect to surface normal n). Light source 42 may include a light-collimating filter layer with an angularly dependent transmission characteristic such as layer 62. Layer 62 may be a hologram, a thin-film interference filter, or other layer of one or more materials that reflects off-axis light (light not aligned with axis Z that is therefore oriented at a non-zero angle with respect to the surface normal of display layers 46 such as a non-zero angle of at least 10° or at least 20°, as examples) more than on-axis light (light aligned with axis Z). As a result, collimated light 44-1 will pass through layer 62 and will serve as collimated illumination for display structures 46 (FIG. 3), whereas off-axis light 44-2 will be recycled back into light-emitting structures 42L. If desired, a polarizer such as polarizer 60 may be used to help polarize collimated light 44-1. Polarizer 60 of FIG. 4 may be a reflective polarizer that passes light that is oriented along a desired axis (e.g., the Y axis) and that reflects orthogonally polarized light (e.g., light aligned with the X-axis). In general, display 14 may include one or more non-reflective polarizers (e.g., external polarizers and/or in-cell polarizers) may include one or more reflective polarizers, or other suitable light polarizing structures.

Figure 5:
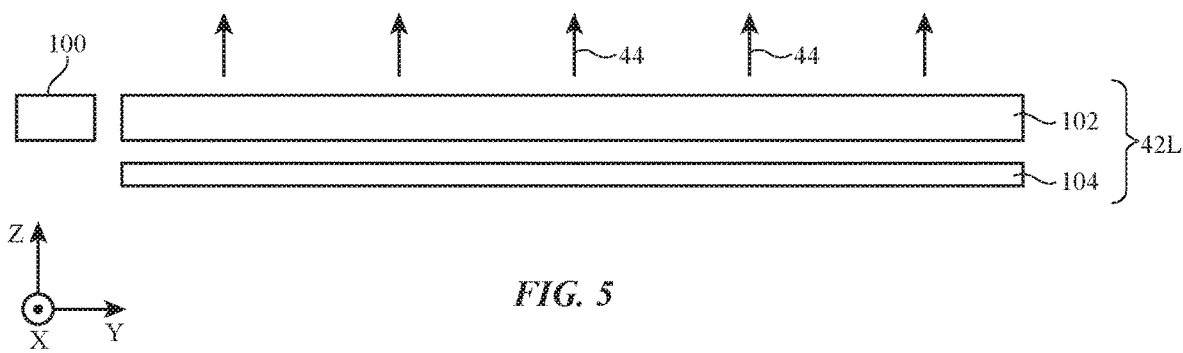
FIG. 5 is a cross-sectional side view of light source structures including an edge-lit light guide in accordance with an embodiment.

As shown in FIG. 5, light-emitting structures 42L may be based on a light guide such as light guide 102. Light guide 102 may be provided with illumination from light source 100. Light guide 102 may be, for example, a thin transparent sheet of polymer or other transparent material having light scattering features. Light source 100 may include one or more light-emitting diodes or other light emitting components and may emit light into one or more edges of light guide 102 (light guide 102 may be an edge-lit light guide). Light that has been emitted into light guide 102 may be distributed in the X-Y plane of FIG. 6 in accordance with the principal of total internal reflection. The light scattering features (pits, grooves, bumps, ridges, light-scattering particles, or holes in light guide 102, printed ink patterns on light guide 102, etc.) may scatter laterally propagating light out of light guide 102 to serve as light 44. Reflector 104 may be used to redirect any downwardly scattered light back in the upwards (+Z) direction.

Figure 6:
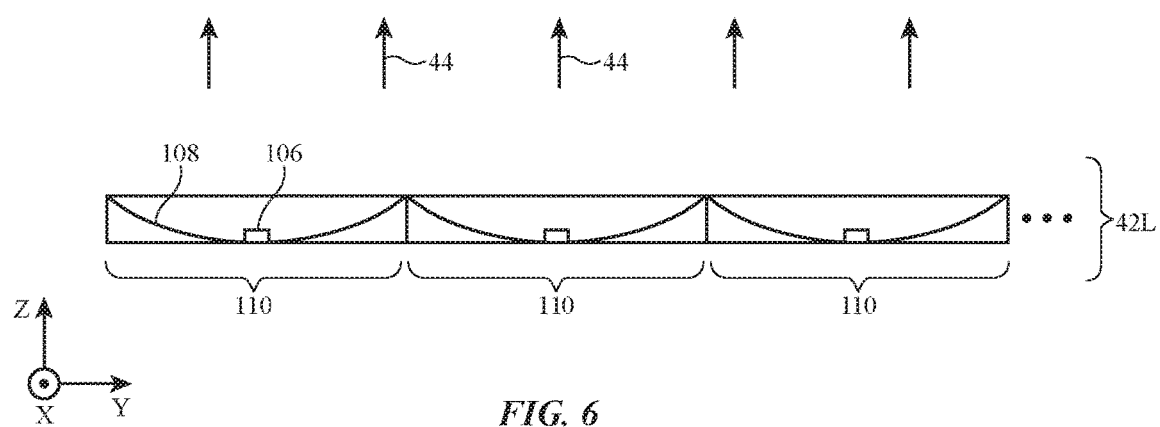
FIG. 6 is a cross-sectional side view of light source structures in a direct-lit lighting configuration in accordance with an embodiment.

In the illustrative configuration of FIG. 6, light-emitting structure 42L has been formed using a direct-lit light source arrangement. With this arrangement, structure 42L includes a two-dimensional array of individually adjustable cells (tiles) 110. Each cell 110 may contain a corresponding light source 106. Each light source 106 may include one or more light-emitting diodes. The light-emitting diodes may emit pump light (e.g., blue light, ultraviolet light, or other shorter wavelength light for pumping quantum dots, quantum rods, or other quantum nanoparticles) or, in other configurations for display 14, may serve as backlight for pixels 22 with color filter elements (e.g., white backlight). Reflectors 108 may be used to reflect light that is emitted from each light sources 106 along the Z axis as light 44. Reflectors 108 may have curved shapes that help collimate light 44.

Figure 7:
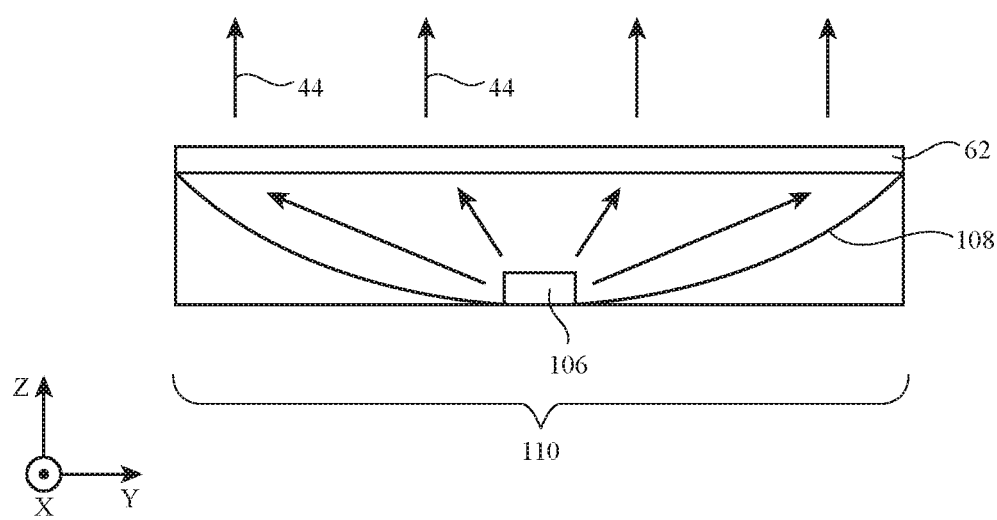
FIG. 7 is a side view of an illustrative direct-lit light source cell having a light collimation structure such as a holographic element in accordance with an embodiment.

If desired, light 44 can be further collimated by covering each cell 110 with a filter layer such as layer 62 of FIG. 7 that exhibits an angularly dependent transmission characteristic. With this type of arrangement, off-axis light rays that strike the lower surface of layer 62 will be recycled back towards reflector 108, whereas collimated on-axis light rays (light rays parallel to the Z-axis) may pass outwardly through layer 62. Layer 62 may be a holographic element (holographic filter), may be a thin-film filter, or may be other suitable filter that selectively passes on-axis light.

Figure 8:
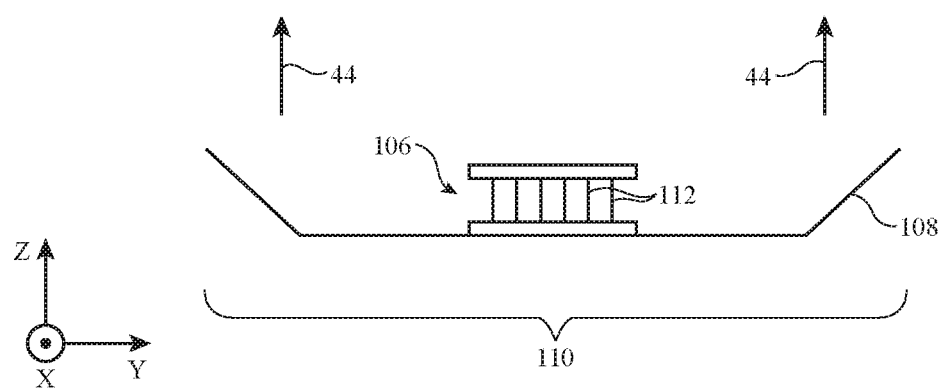
FIG. 8 is a cross-sectional side view of a direct-lit light source cell having a light source with nanorods in accordance with an embodiment.

In the illustrative example of FIG. 8, light source 106 has been formed from nanorods 112. Nanorods 112 may be oriented horizontally, may be oriented vertically along the Z-axis as shown in FIG. 8, or may have other suitable orientations. Electrodes 114 and 116 (e.g., a metal electrode from which nanorods 112 are grown and an electrode formed from a consolidated layer of nanorods and/or other conductive electrode structures) may be used in applying current through nanorods 112 so that nanorods 112 emit light 44. Light 44 may tend to be polarized (e.g., with an electric field in the X-Y plane of FIG. 8). The polarization of light 44 of cell 110 of FIG. 8 may, if desired, be at least partially maintained by forming reflectors 108 from structures that tend to reflect the polarized upwards as collimated light 44 without altering the polarization state of the light.

If desired, light source 106 may include other types of light-emitting device configured to emit polarized light. Light source 106 may, for example, be a laser such as a vertical-cavity surface-emitting laser. The vertical-cavity surface-emitting laser may have a strained semiconductor die that causes the laser to emit light that is at least 70% or at least 80% linearly polarized. Polarized light may also be produced from other lasers or light-emitting diodes (e.g., strained or unstrained surface-emitting and/or edge-emitting devices with Bragg gratings and/or angled output facets). With one illustrative configuration, light source 106 may be a resonant cavity light-emitting diode (e.g., a resonant cavity light-emitting diode with strained semiconductor layers and/or other structures that enhance the polarization of output light). If desired, a polarizer structure may be formed at the output of a light source that is supplying light to a cell or edge-lit light guide (e.g., to help polarize the light before the light is distributed within the cell or light guide).

Figure 9:
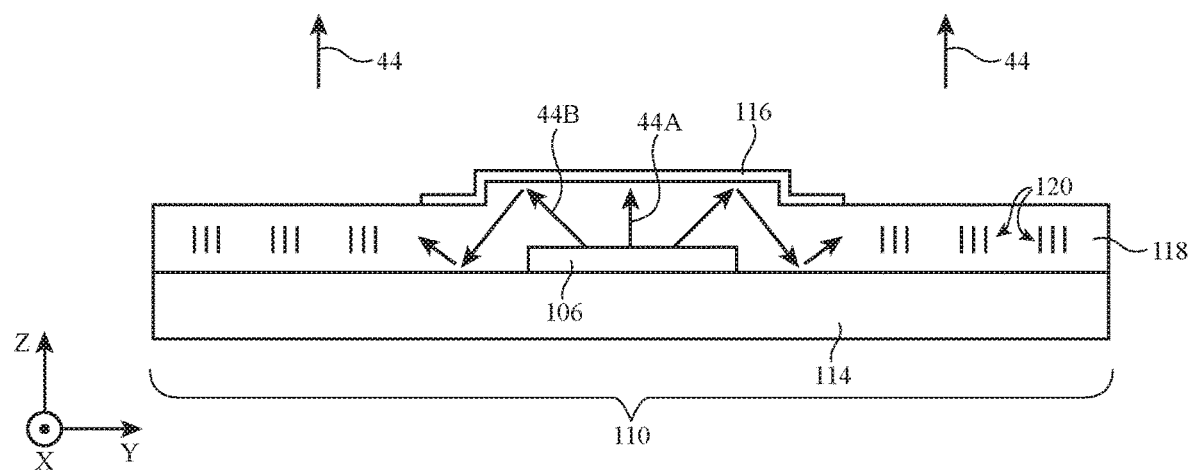
FIG. 9 is a cross-sectional side view of a direct-lit light source cell having an index-matched layer with light-redirecting features such as grating features in accordance with an embodiment.

FIG. 9 is a cross-sectional side view of an illustrative light source cell in which a light-emitting device such as a laser or light-emitting diode is covered with an index-matching coating with light redirecting structures. As shown in FIG. 9, light source 106 may be formed from one or more light-emitting devices mounted on a substrate such as substrate 114 (e.g., a printed circuit, a printed circuit covered with a polymer or inorganic buffer layer such as a buffer layer with a relatively low index of refraction, etc.).

Light source 106 may include one or more light-emitting diodes. For example, light source 106 may include one or more blue light-emitting diodes such as group III-nitride-based light-emitting diodes. Light source 106 may be covered with a layer such as layer 118. Layer 118 may be formed from a transparent material (e.g., a clear polymer or an inorganic layer) and may have light-redirecting structures 120 (sometimes referred to as out-coupling structures) such as gratings, thin-film filter structures, protrusions, grooves, or other light scattering structures, and/or other structures for coupling light out of the waveguide formed by layer 118. Light-redirecting structures 120 may be formed using photolithography, molding, laser processing, machining, and/or other fabrication techniques.

Light that is emitted by light source 106 may be distributed laterally within layer 118 (in the X-Y plane of FIG. 9) in accordance with the principal of total internal reflection. When this light reaches a light-redirecting structure (e.g., a grating or other light-redirecting structure 120), it is redirected (e.g., diffracted) upwardly along the Z-axis as light 44. Light-redirecting structures 120 may each include a respective grating or other structure that is associated with a respective pixel 22 and/or may be formed from uniform and/or pseudorandomly oriented structures. The pattern of light-redirection structures 120 in layer 118 may be configured to create uniform patterns of light 44 across all of the pixels 22 of display 14.

The index of refraction of semiconductor structures such as group III-nitride-based light-emitting diodes is about 2.45-2.4 at wavelengths of 400-500 nm. To reduce reflections at the output of light source 106, layer 118 may be formed from a material with an index-matched refractive index value (e.g., a refractive index of 2.4 or other value that is within 25%, within 20%, within 15%, within 10%, within 5%, within 1%, or within other suitable amounts of the index of refraction of light source 106). As an example, layer 118 may be formed from titanium oxide (e.g., titania with a refractive index of 2.2-2.4), silicon nitride, silicon oxynitride, aluminum oxide, silicon oxide, other oxides, other nitrides, other inorganic materials, mixtures of these inorganic materials, and/or organic materials with appropriate refractive index values.

With one illustrative configuration, light source 106 may include a group III-nitride-based light-emitting diode (e.g., a micro-light-emitting diode with lateral dimensions of 15 microns or less or other suitable size or other light-emitting diode) of 1-2 microns in thickness and layer 118 may have a thickness of 2-4 microns. A thin-film reflector (e.g., a dielectric stack forming a thin-film interference filter structure, a metal layer, or other reflective thin-film structure) such as thin-film reflector 116 may be formed on layer 118 with a shape that overlaps light source 106. The p contact of the group III-nitride-based light-emitting diode(s) of source 106 may be located adjacent to substrate 114 and may be formed from a reflective material such as silver or other suitable metal. The active layer of the group III-nitride-based light-emitting diode(s) may be positioned relative to the p contact so that vertically emitted light 44A from the group III-nitride-based light-emitting diode(s) experiences destructive interference when reflecting off of the lower side of layer 116 and so that diagonally emitted light 44B experiences constructive interference when reflecting off of layer 116. Due to the destructive interference for on-axis light (parallel to the Z axis and the surface normal of cell 110 and layer 118) and the constructive interference for off-axis light (light propagating at non-zero angles with respect to the Z axis), light from light source 106 may be emitted into layer 118 with a desired angular spread (over a range of angles tilted with respect to the Z axis). A thin p-type layer (e.g., 60 nm of a material such as GaN or other suitable material) may be used in forming the group III-nitride-based light-emitting diodes and the silver layer forming the p contact may be formed directly on the surface of the group III-nitride-based light-emitting diode(s) to help maximize the destructive interference of light such as light 44A and maximize constructive interference of tilted light such as light 44B (e.g., light with an angle that is suitable for waveguide propagation within layer 118). Source 60 has quantum wells and the distance between the last quantum well (i.e., the quantum well that is closes to the p-GaN) and the p-contact metallization is generally less than 70 nm, and preferably less than 60 nm. Due to index matching between light-source 106 and layer 118, the angular distribution of light emissions from light source 106 may be preserved in a desired pattern.

To help ensure that light 44 is distributed uniformly over each cell 110, cells 110 may include reflective structures. Consider, as an example, the arrangement of FIG. 10. As shown in the top view of illustrative cell 110 in FIG. 10, cell 110 (e.g., layer 118) may have openings such as holes 118H. Holes 118H may have vertical sidewalls or sidewalls of other shapes and may be formed by etching (as an example). Reflective coatings (a layer of metal, etc.) such as coating 122 may be formed in cell 110 (e.g., in holes 118H, along the edges of cell 110, etc.) to help redistribute light 44B emitted from light source 106.

Structures 120 may include gratings. With one illustrative configuration, a first portion (e.g., a first half) of structures 120 may have gratings that run parallel to a first dimension (e.g., axis X) and a second portion (e.g., a second half) of structures 120 may have gratings that run parallel to a second dimension (e.g., axis Y). Diversifying the rotational orientation of the gratings of structures 120 may help reduce the mean path length before light 44B is extracted as light 44, thereby minimizing waveguide losses in layer 118. The shape (e.g., the outline when viewed from above) of light source 106 may be configured so that light source 106 fits between structures 120 (e.g., structures 120 associated with respective overlapping pixels 22). For example, light source 106 may have a cross-shaped footprint as shown in FIG. 10 with arms that run between respective pairs of structures 120 (and therefore between respective pairs of overlapping pixels 22).

Figure 10:
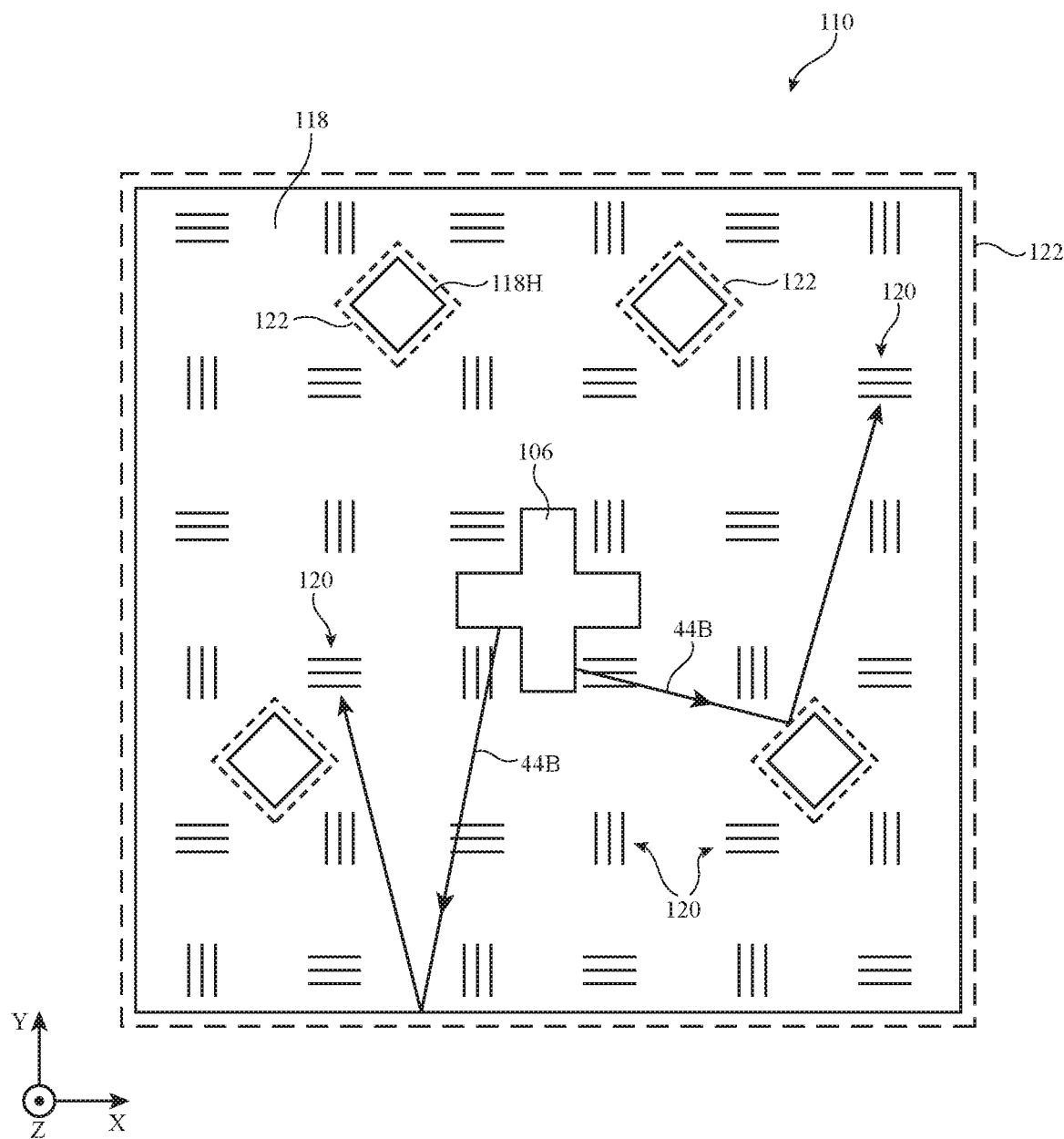
FIG. 10 is a top view of an illustrative direct-lit light source cell of the type shown in FIG. 9 in accordance with an embodiment.

Light 44B that is emitted by source 106 may have polarization in which the electric field of light 44B lies predominantly in the X-Y plane of FIG. 10 (e.g., in the plane of cell 110) or other suitable polarization. Light with certain ranges of angular orientations with respect to the Z axis (e.g., off-axis light) may exhibit constructive interference and certain range of angular orientations with respect to the Z axis (e.g., on-axis light) may exhibit destructive interference. Constructive interference may, for example, create lobes of higher intensity light 44B along predefined orientations with respect to axis Z. Gratings in structures 120 can be configured to redirect light 44B having certain predefined k-vectors vertically along axis Z. Because constructive interference dominates in certain angular ranges and because the gratings of structures 120 are appropriately configured to handle this light, out-coupled light 44 will exhibit a well-defined beam divergence (e.g., 20-30° or narrower) as established by the properties of the gratings forming structures 120 and the spectral bandwidth of light source 106.

Figure 11:
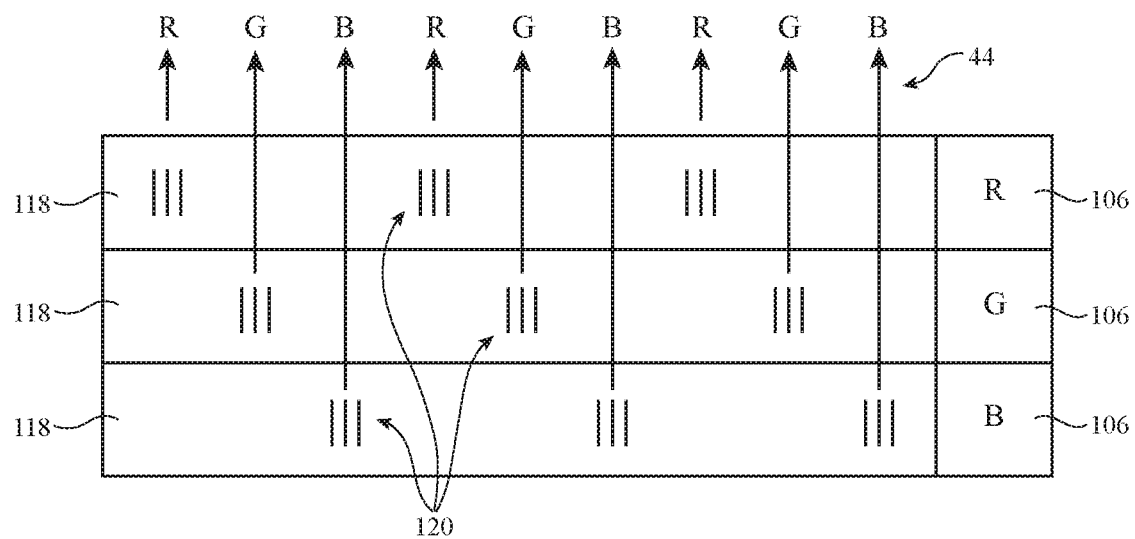
FIG. 11 is a cross-sectional side view of an illustrative light source having a stack of multiple light-emitting devices such as light-emitting diodes or lasers of different colors in accordance with an embodiment.

As shown in FIG. 11, multiple waveguide layers 118 may be stacked (e.g., high-index materials such as titania layers may be formed with intervening lower-index buffer layers such as silicon oxide layers or polymer layers and/or other stacked waveguides may be formed) and each of these multiple waveguide layers may receive light from a light source of a respective color (e.g., a first of layers 118 may receive red light R from a light source 106 that produces light at red wavelengths, a second of layers 118 may receive blue light B from a light source 106 that produces light at blue wavelengths, and a third of layers 118 may receive green light G from a light source 106 that produces light at green wavelengths). Each layer 118 may guide light of a different wavelength to a set of tuned light redirecting structures (gratings) 120 in that layer, thereby allowing light of multiple colors (R, G, B) to be redirected outwardly as light 44 to illuminate corresponding pixels 22. Light sources 106 may be centrally located within each cell 110 and/or may emit light into the edge of waveguide layers such as layers 118. If desired, a single waveguide layer 118 may carry multiple wavelengths of light (e.g., red, green, and/or blue) supplied by respective light sources 106.

Figure 12:
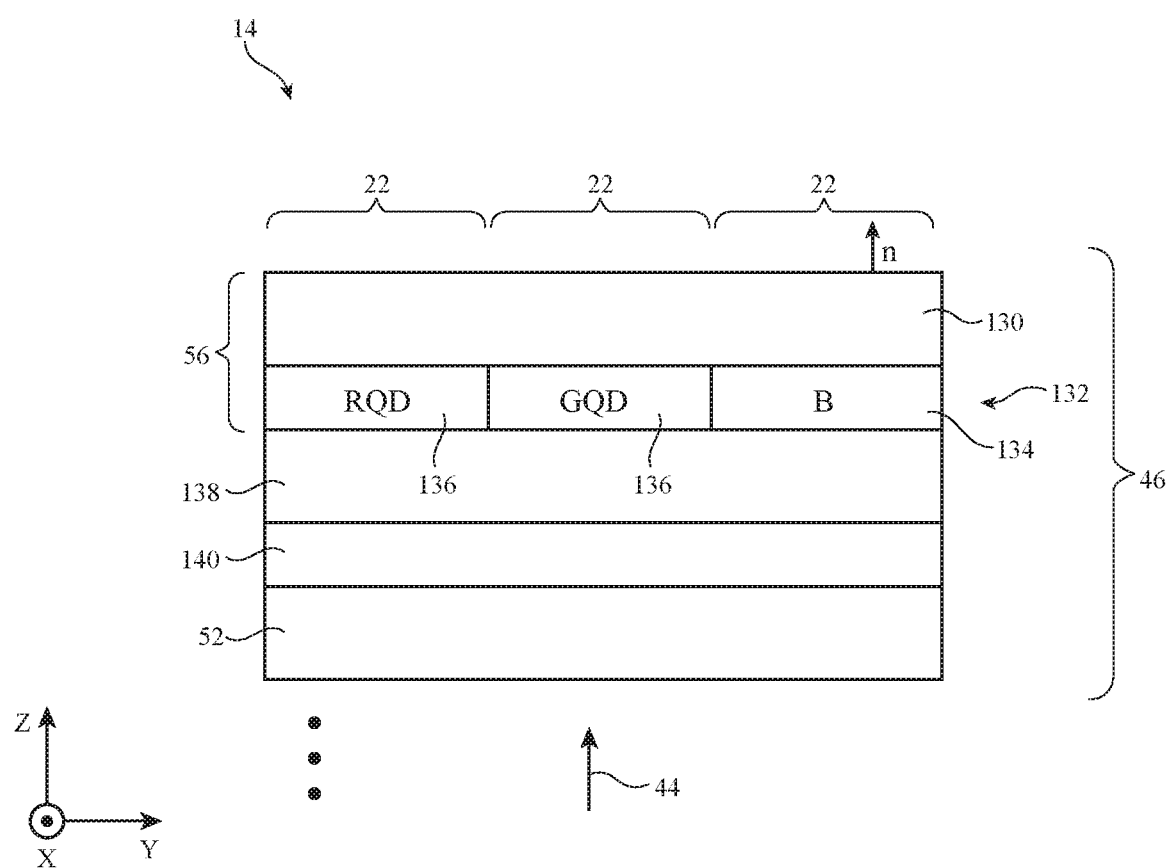
FIG. 12 a cross-sectional side view of a portion of an illustrative display with quantum nanoparticles such as quantum dots in accordance with an embodiment.

A cross-sectional side view of a portion of an illustrative display for device 10 is shown in FIG. 12. In the example of FIG. 12, display 14 includes a layer with an array of colored pixel elements such as layer 56. Layer 56 may include layers such as transparent substrate layer 130 (e.g., a glass layer or plastic layer with a thickness of 0.3-0.7 mm, a thickness of at least 0.2 mm, a thickness of less than 1 mm, etc.). Layer 130 may be the outermost substrate layer of display 14 and/or may be an internal substrate layer. Layer 132 may be formed on layer 56 (e.g., on an inner surface of layer 130) and may include an array of colored elements (colored pixel elements for corresponding pixels 22). The colored elements of layer 132 may, in general, include colored filter elements and/or quantum nanoparticle elements (e.g., elements formed from quantum dots or quantum rods).

With the illustrative arrangement of FIG. 12, layer 132 includes a blue (B) color filter element 134 and includes quantum dot elements such as red (R) and green (G) quantum dot elements 136. If desired, other photoluminescent materials and color filtering arrangements may be used can be used (e.g., phosphorous and color filters can be used in forming elements 136, quantum rods may be used, etc.). Layer 132 allows display 14 to display color images. Light 44 from light source 42 may be blue light. The intensity of light 44 in each of pixels 22 may be modulated using liquid crystal pixel structures formed from thin-film transistors, thin-film capacitors, thin-film electrodes, and/or other thin-film circuitry (e.g., thin film circuitry in layer 58). In an arrangement in which layer 130 is the outermost layer of display 14, the intensity of blue light 44 is modulated before reaching layer 132. In flipped panel arrangements, light can be modulated after passing through colored elements in layer 132.

In the blue pixels of display 14, blue light 44 passes through blue color filter element 134. Color filter element 134 may contain blue polymer (e.g., polymer containing blue dye or pigment) and may allow blue light 44 from light source 42 to pass. If desired, diffuser layers and/or clear polymer layers may be incorporated into element such as element 134 instead of using blue polymer or in addition to using blue polymer to form element 134. The blue light 44 from light source 42 serves as pump light for quantum dot elements 136. Each quantum dot element may have cadmium selenide particles or other quantum nanoparticles (e.g., quantum dots or quantum nanorods) that are configured to emit light of a desired wavelength in response to absorbing pump light 44. For example, red elements 136 may include red quantum dots in a polymer binder that emit red light when pumped with blue light 44 and green elements 136 may include green quantum dots in a polymer binder that emit green light when pumped with blue light 44. Layer 132 may have a thickness of 10 microns, 5-15 microns, at least 2 microns, at least 7 microns, less than 20 microns, or other suitable thickness.

To help enhance display performance and efficiency, display 14 may include one or more filter layers such as filter layer 140. Filter layers in display 14 such as filter layer 140 may be formed from materials with desired spectral transmission characteristics (e.g., a transmission characteristic that absorbs one or more wavelengths of light and that transmits one or more other wavelengths of light based on the bulk optical properties of the materials and/or may be formed from stacks of dielectrics, semiconductors, and/or metals to form a thin-film interference filter that passes and blocks desired wavelengths of light. Cholesteric liquid crystal filters may also be formed with desired spectral transmission characteristics for use as filter layer 140.

Filter (filter layer) 140 of FIG. 12 may, as an example, be configured to pass blue light while reflecting red and green light. With this type of arrangement, blue pump light 44 may pass through filter 140 to pump quantum dots 136 in red and green pixels and may pass through filter 140 and blue color filter elements 134 in blue pixels. Red and green light that is generated in the red and green quantum dots of layer 134 and that is propagating in the −Z direction may be recycled back in the +Z direction by reflecting off of filter 140.

Light 44 may be polarized when exiting light source 42 and/or upon passing through a lower polarizer layer in display 14 (e.g., a polarizer interposed between liquid crystal layer 52 and light source 42). An upper polarizer for display 14 may be formed using a layer of polarizer material located above layer 56 and/or at other suitable location above layer 52 or be formed using an in-cell polarizer such as in-cell polarizer 140 of FIG. 12.

Figure 13:
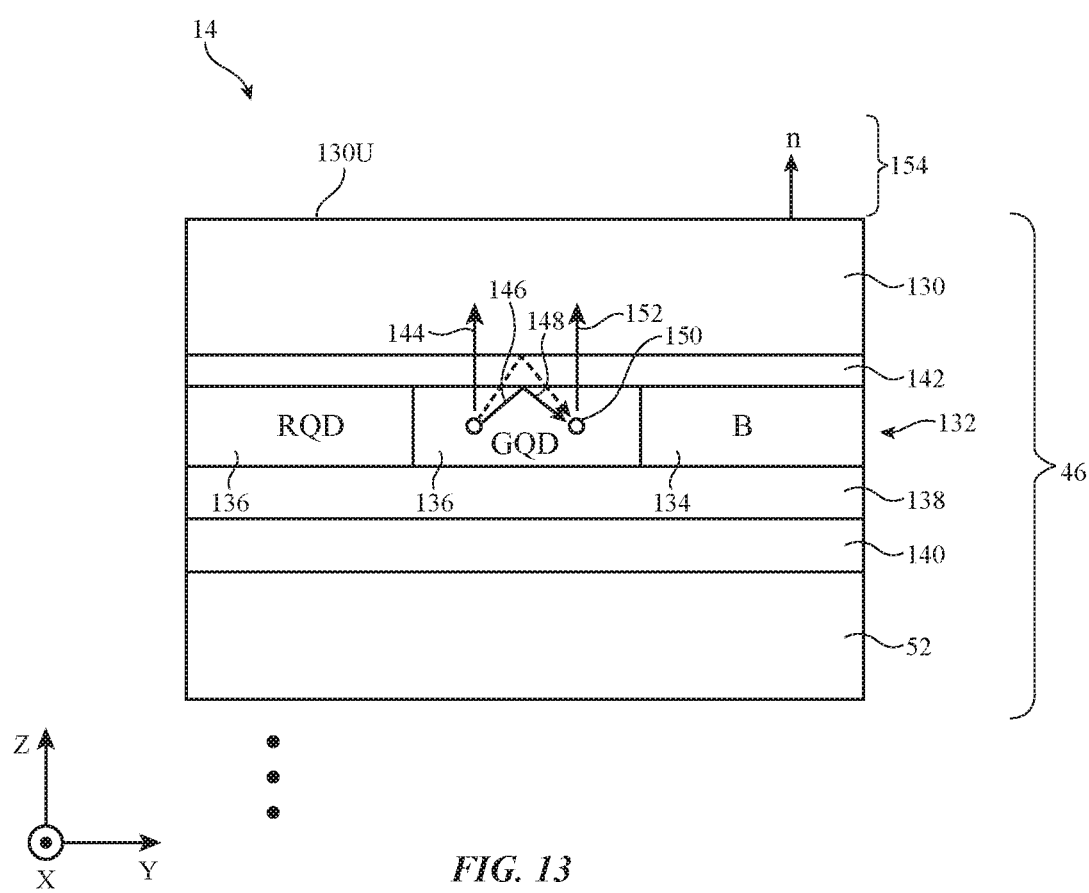
FIG. 13 is a cross-sectional side view of a portion of an illustrative display with low refractive index layer to help recycle off-axis light emitted from quantum dot elements in accordance with an embodiment.

If desired, one or more low refractive index layers may be incorporated into display 14 to help recycle off-axis light. This may enhance the collimation of emitted light and improve display efficiency. As an example, consider the illustrative configuration of FIG. 13. In the example of FIG. 13, low refractive index layer 142 has been interposed between layer 130 (e.g., a display cover layer or other substrate) and layer 132. Layer 130 may be formed from a material such as glass and may have a refractive index of 1.5 (as an example). Layer 142 may have a refractive index that is lower than the refractive index of layer 130. For example, the refractive index of layer 142 may be 1.1-1.4, at least 1.2, at least 1.3, less than 1.4, less than 1.35, less than 1.3, etc. The refractive index of layer 132 may be about 1.5-1.7, at least 1.4, less than 1.7, etc. Air in region 154 may have an index of refraction of 1, which gives rise to an index-of-refraction difference with layer 130 at glass-air interface 130U (the upper surface of layer 130).

During operation, on-axis light that is emitted light from quantum dot elements 136 such as light ray 144, may pass outwardly parallel to the Z-axis (and parallel to display surface normal n). Because light 144 is parallel to the Z-axis, light 144 will pass through interface 130U without being reflected inwardly due to total internal reflection. If off-axis light were present at interface 130U, this off-axis light might reflect at interface 130U due to total internal reflection and might then travel significant lateral distances (distances in the X-Y plane) before striking a colored pixel element in layer 132 due to the relatively large thickness of layer 130. This could cause a green ray of light to enter a red quantum dot (as an example), leading to crosstalk between pixels.

With the configuration of FIG. 13, off-axis rays such as ray 146 that are emitted from a quantum dot element, are reflected inwardly (at least somewhat towards the −Z direction) as shown by reflected ray 148 due to total internal reflection at the interface between layer 132 and layer 142 (e.g., when the refractive index of layer 142 is less than the refractive index of layer 132) and/or due to reflection at the interface between layers 142 and 130 due to refractive-index mismatch between layers 142 and 130. Layer 142 is relatively thin. For example, the thickness of layer 142 may be 2-5 microns, at least 1 micron, at least 2 microns, at least 5 microns, fewer than 100 microns, fewer than 20 microns, fewer than 10 microns, or other suitable thickness. As a result, the interface between layer 142 and layer 130 is relatively close to the upper surface of layer 132, so even if light 146 reflects off of the interface between layer 142 and 130 rather than the interface between layer 132 and layer 142, reflected light rays such as ray 148 will not tend to travel excessively in lateral directions X and Y before being returned to layer 132. This may help prevent recycled light that is associated with a pixel of one color from spreading into adjacent pixels of different colors. As shown in FIG. 13, for example, inwardly directed rays such as ray 148 may be scattered and/or absorbed and reemitted by quantum dots such as quantum dot 150 in the same quantum dot element from which ray 146 was emitted. For example, green light 146 may be reabsorbed and/or scattered by green quantum dot 150 rather than impinging on a red quantum dot in an adjacent pixel. After scattering from dot 150 and/or being reemitted from dot 150, this light has a renewed opportunity to form collimated light that will pass through interface 130U (see, e.g., collimated light 152).

Figure 14:
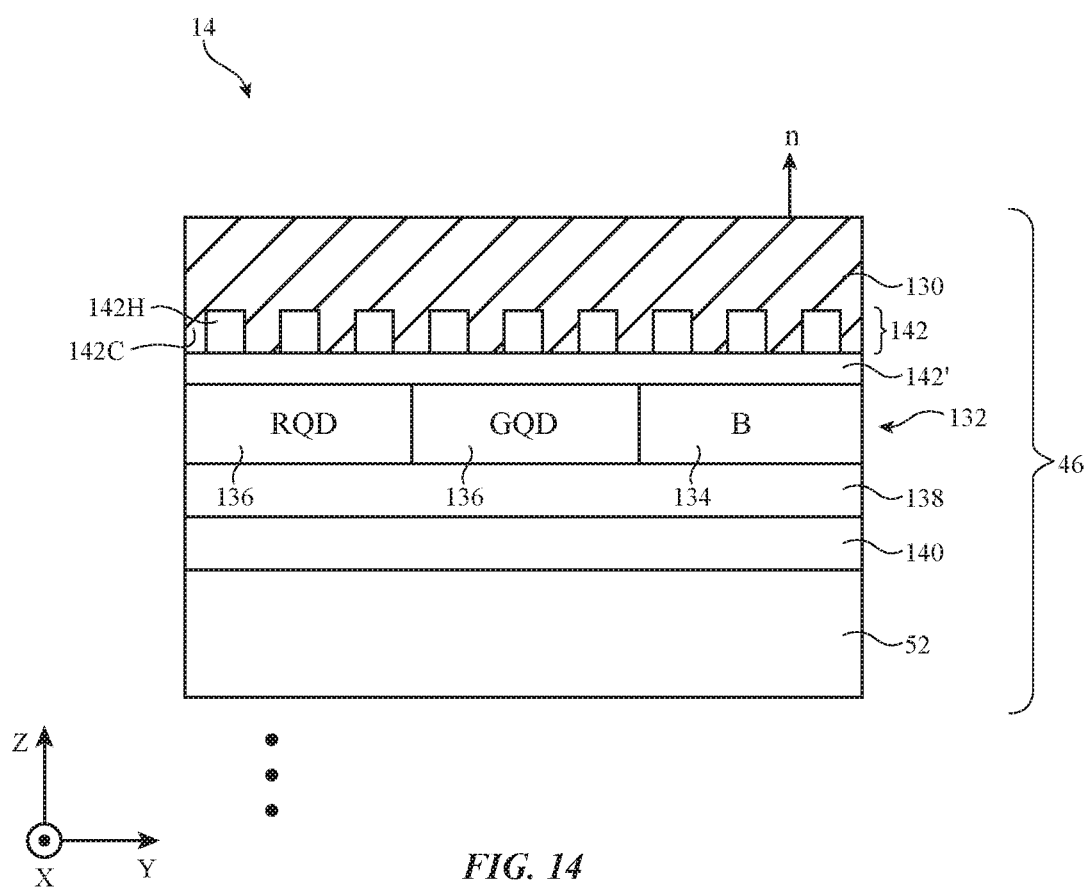
FIG. 14 is a cross-sectional side view of a portion of an illustrative display with a low-index-of-refraction layer to help recycle off-axis light in accordance with an embodiment.

As shown in the illustrative configuration of FIG. 14, low-index layer 142 may be formed by patterning the inner surface of layer 130. This creates areas of low refractive index (e.g., areas from which portions of the glass or other material forming layer 130, which may have index values of about 1.5, have been selectively removed and replaced with vacuum, air, or other gases, which may have index values of about 1.0). The selectively removed portions are small and therefore do not create optically noticeable individual features but rather cause the overall effective index for the patterned region to be reduced (e.g., the index in region 142 is an average of the index of the 1.5 index regions with the index of the 1.0 index regions and may be characterized by a average (effective) value of 1.25 (as an example).

Etching techniques and/or other fabrication techniques may be used in forming recesses such as recesses 142H (e.g., holes, grooves, etc.) among unrecessed portions of layer 130 such as regions 142C. Recesses 142H may have lateral dimensions of 0.5-2 microns, at least 0.1 microns, at least 0.5 microns, at least 1 micron, fewer than 10 microns, fewer than 4 microns, or fewer than 2 microns. Recesses 142H may have depths of 2-5 microns, at least 1 micron, at least 2 microns, at least 5 microns, fewer than 100 microns, fewer than 20 microns, fewer than 10 microns, or other suitable depths. Optional glass plate 142' may be incorporated into layer 142 to help prevent portions of layer 132 from intruding into recesses 142H. Layer 142' may be at least 1 micron thick, at least 2 microns thick, fewer than 25 microns thick, etc.

Figure 15:
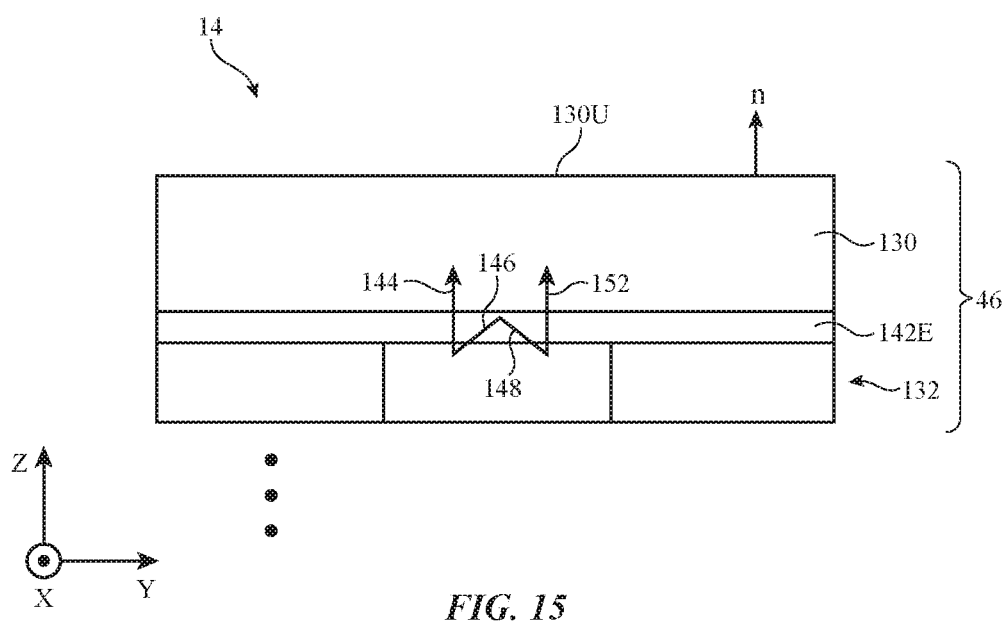
FIG. 15 is a cross-sectional side view of a portion of an illustrative display with a holographic layer with an angularly dependent light transmittance in accordance with an embodiment.

In some configurations for display 14, a holographic element or other optical element that serves as a filter with an angularly dependent transmission may be used to help collimate light exiting layers 46. FIG. 15 shows how a holographic layer such as layer 142E may be interposed between layer 130 and layer 132. Layer 142E may have a higher transmission for on-axis light (light in a range of angles parallel to axis Z and surface normal n) and lower transmission for off-axis light (light at wider angles). On-axis light rays exiting layer 132 such as light ray 144 will pass through layer 142E and upper surface (interface) 130U (where layer 130 meets surrounding air) and, due to the on-axis nature of these light rays, will pass through layer 130 without being reflected due to total internal reflection. Off-axis light rays exiting layer 132 such as light ray 144 will be reflected by layer 142E close to layer 132. As a result, off-axis light can be recycled by the quantum dots of layer 132 to form on-axis light 152 that passes through interface 130U. If desired, prism films and other films with optical features in the films may be used in collimating light 44.

If desired, layer 142 may be formed from low-index-of-refraction structures other than recesses 142H. For example, layer 142 may be formed from a polymer layer (e.g., a polymer layer with an index of refraction of 1.25-1.35, at least 1.25, at least 1.3, at least 1.35, less than 1.4, less than 1.35, etc. such as a fluorinated polymer or siloxane polymer). As another example, layer 142 may be formed from air-infused silica (e.g., silica with bubbles, silica into which hollow microspheres or other low-index particles have been incorporated, etc.). Air-infused silica layers may have index-of-refraction values of 1.2, at least 1.25, at least 1.3, less than 1.4, less than 1.35, less than 1.3, less than 1.25, etc.

If desired, light 44 may be ultraviolet light and each blue color filter element 134 may be a blue quantum dot element formed from blue quantum dots in a layer of polymer binder. Color filter elements may, if desired, be included in pixels 22 that also include quantum dot elements. In the arrangements of FIGS. 12-14, elements 136 are formed from quantum dots and element 134 is formed from blue color filter material. This is, however, merely illustrative. Each colored pixel element in layer 132 may include color filter elements, quantum nanoparticle elements, diffuser, clear material, and/or other suitable structures.

Layer 142E may have high transmission for light that is oriented parallel to axis Z (and surface normal n) such as light 144 and may reflect (and therefore recycle) off-axis light such as light 146. In the example of FIG. 15, a layer such as holographic layer 142E (e.g., a hologram) with a transmission characteristic that favors on-axis light over off-axis light has been incorporated into layers 46 instead of incorporating low-index layers such as layer 142. If desired, a layer such as layer 142E may be incorporated into display 14 in addition to incorporating one or low-index layers such as layer 142 into layers 46. In the example of FIG. 15, holographic layer 142E has been interposed between layer 132 and layer 130. Layers such as layer 142E may be incorporated elsewhere in layers 46, if desired.

A cross-sectional side view of an illustrative display for device 10 is shown in FIG. 16. In the configuration of FIG. 16, display 14 has a light source such as light source 42L that emits light 44 such as white light. If desired, light source 42L may include a filter layer that exhibits an angularly dependent transmission characteristic to help recycle off-axis light as described in connection with layer 62 of FIG. 4 (for an edge lit light guide layer configuration) and layer 62 of FIG. 6 (for a direct-lit configuration having an array of individually adjustable light-source cells 110) or may use other suitable light source structures. As shown in FIG. 16, display 14 may include upper polarizer 154 and lower polarizer 60. In-cell polarizers may also be used in display 14, if desired. In configurations in which light source 42L emits polarized light, lower polarizer structures such as illustrative external lower polarizer 60 of FIG. 16 may be omitted or the strength of the lower polarizer structures may be reduced.

In the illustrative configuration of FIG. 16, layers 56 and 58 are sandwiched between polarizers 154 and 60. Liquid crystal layer 52 is interposed between layers 56 and 58. As shown in FIG. 16, layer 58 may include substrate 160 (e.g., a layer of clear glass or polymer), a layer of thin-film transistor circuitry such as thin-film transistor circuitry 158 on substrate 160, and liquid crystal alignment layer 156 (e.g., a polyimide layer). Layer 56 may include substrate 162 (e.g., a clear glass or polymer layer that is used in forming display cover layer 130 and/or an internal layer in display layers 46). Colored pixel element layer 132 may be formed on substrate 162 and may include color filter elements 150 such red color filter elements for red pixels 22R that pass red light, green color filter elements 150 for green pixels 22G that pass green light, and blue color filter elements 150 for blue pixels 22B that pass blue light.

Color filter elements 150 may be formed within respective openings in light-blocking matrix 152. Matrix 152 may have the shape of a grid with openings for pixels (e.g., rectangular pixel openings, chevron-shaped pixel openings, etc.). The material for forming matrix 152 may be opaque, so that matrix 152 blocks stray light from adjacent pixels and prevents color crosstalk. Matrix 152 may be formed from black ink (e.g., a polymer binder containing black particles such as particles of carbon black or other dark pigments or a polymer containing dark dyes), may be formed from metal, or may be formed from other opaque masking materials. Liquid crystal alignment layer 157 (e.g., a polyimide layer) may be formed on the inner surface of layer 56 facing liquid crystal layer 52.

In the illustrative configuration of FIG. 17, display 14 has an array of quantum nanoparticle elements such as quantum dot elements. To pump the quantum dot elements, light source 42L may be configured to emit pump light light 44. Pump light 44 may be emitted using a direct-lit configuration with multiple individually adjustable cells in light source 42L or in an arrangement for light source 42L that includes an edge-lit light guide layer. Pump light 44 may have a wavelength that is sufficiently short to excite the quantum dots in layer 132. For example, if layer 132 includes red, green, and blue quantum dots, pump light 44 may be ultraviolet light. If layer 132 includes red and green quantum dots and no blue quantum dots, pump light 44 may be blue light.

Colored pixel element layer 132 may include an array of colored pixel elements each of which includes two or more sublayers of materials. For example, each pixel 22 in display 14 may have a first layer with quantum dots and a second layer with color filter material that helps filter out stray light (e.g., unconverted pump light). As shown in FIG. 17, for example, layer 56 may include a colored pixel element layer such as layer 132 that includes a first layer such as layer 132A with quantum dot structures and a second layer such as layer 132B with color filter elements. Liquid crystal layer 52 may be interposed between layer 56 and layer 58. Lower polarizer 60 may be formed on the lower surface of substrate 160 or may be omitted in configurations in which light source 42L produces polarized light. The upper polarizer in display 14 may, if desired, be formed using an in-cell polarizer configuration, as shown by in-cell polarizer 154C. An in-cell polarizer may also be used in forming lower polarizers for displays 14, if desired.

Filter layer 164 of FIG. 17 may be configured to pass pump light (e.g., blue or ultraviolet light) while reflecting and thereby recycling light at other wavelengths (e.g., red and green light produced by red and green quantum dots). In some arrangements, filter layer 164 may be formed from a stack of dielectric layers forming a thin-film interference filter and may have materials with an index of refraction of 1.4-1.6, at least 1.4, at least 1.45, less than 2, less than 1.7, etc. (as examples). Filter layer 164 may also be formed using other filter configurations (e.g., a cholesteric liquid crystal filter arrangement).

Red pixels 22R may each include a red quantum dot element 136R (e.g., an element with red quantum dots in a polymer binder) in layer 132A and a red color filter element 150R in layer 132B. Green pixels 22G may each include a green quantum dot element 136G (e.g., an element with green quantum dots in a polymer binder) in layer 132A and a red color filter element 150G in layer 132B. Blue pixels 22B may be configured appropriately for the type of pump light being produced by light source 42L.

With a first illustrative configuration for display 14 of FIG. 17, light source 42L is configured to produce ultraviolet pump light 44. In this configuration, elements 134B in layer 132A of blue pixels 22B may be blue quantum dot elements that produce blue light when pumped with ultraviolet light and elements 150B in layer 132B may be blue color filter elements. Filter layer 164 in this configuration may be an ultraviolet pass filter that passes ultraviolet pump light 44 while reflecting red, green and blue light to enhance output efficiency. For example, filter layer 164 may be a thin-film interference filter or may be a cholesteric liquid crystal filter that is configured to pass ultraviolet light while reflecting red, green, and blue light. To help reduce the output of unconverted ultraviolet light from the front of display 14, an ultraviolet-light cut filter material may be incorporated into the elements of layer 132B and/or may be interposed at other locations between layer 132A and the front of display 14 (e.g., an ultraviolet cut filter may be interposed between layers 132A and 132B, may be interposed between layer 132B and substrate 162, etc.).

With a second illustrative configuration for display 14 of FIG. 17, light source 42L is configured to produce blue pump light 44. In this configuration, blue pixels 22B may contain light-diffusing material in elements 134B (e.g., elements 134B may be diffuser elements) to diffuse blue pump light so that the angular distribution of output light in the blue pixels matches that of the red and green light being emitted from the quantum dots in the red and green pixels. Blue pixels 22B may also contain, if desired, clear polymer in elements 150B or blue color filter material in elements 150B. Filter layer 164 in this configuration may be a blue light pass filter (e.g., a thin-film filter or cholesteric liquid crystal filter) that reflects red and green light to enhance the output efficiency of the red and green pixels. If desired, elements 150R and 150G may be formed from yellow color filter material instead of red and green color filter material. The yellow color filter material may be used to absorb residual (unconverted) blue pump light and thereby ensure that the red and green pixels do not appear too bluish in color.

Light-blocking matrix 152 may be interposed laterally (in dimensions X and Y) between the colored pixel elements in layer 132. To help improve lateral light recycling, matrix 152 may be formed from a reflective material such as reflective metal (e.g., matrix 152 may be a light-reflecting matrix formed from aluminum or other metal). As quantum dots in the elements of layer 132A emit light laterally, this emitted light will be reflected back towards the quantum dots by the reflective material of matrix 152 and scattered and/or absorbed and reemitted, thereby enhancing efficiency.

Figure 18:
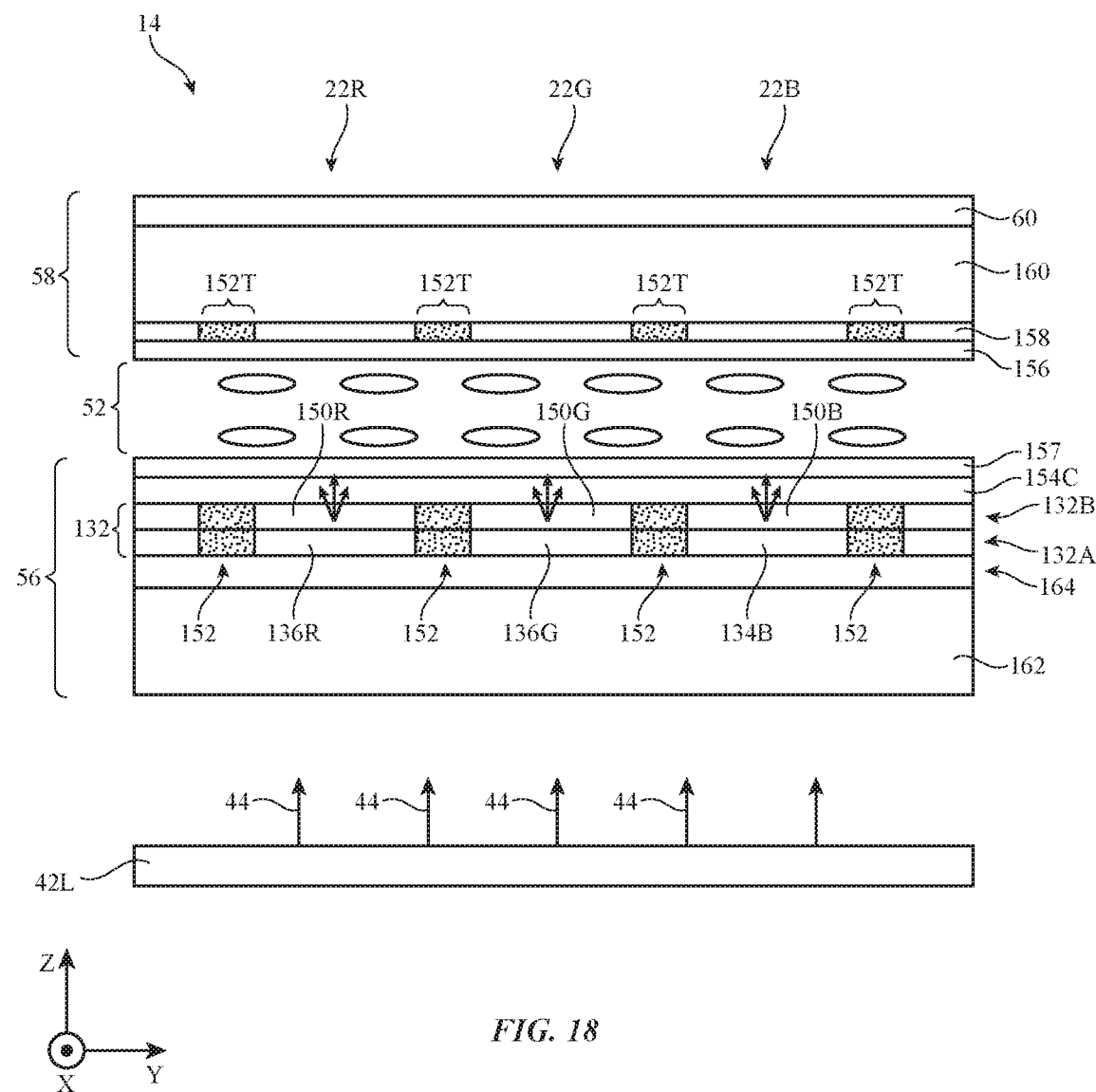
FIG. 18 is a cross-sectional side view of an illustrative display having color filter elements and quantum dot elements of different corresponding colors in an inverted thin-film transistor layer display configuration in which a layer of thin-film transistor circuitry is interposed between a display cover layer and a liquid crystal layer in accordance with an embodiment.

FIG. 18 is a cross-sectional side view of display 14 in an illustrative inverted display panel configuration (sometimes referred to as a flipped thin-film transistor panel or FTP configuration). In this type of arrangement, light 44 from light source 42 passes through layer 132 of layer 56 before passing through liquid crystal layer 52 and thin-film transistor layer 58. Light source 42L may produce quantum dot pump light such as blue or ultraviolet light.

Layer 56 may include substrate 162, filter layer 164, colored pixel element layer 132, in-cell polarizer 154C, and liquid crystal alignment layer 157. Liquid crystal alignment layer 157 may be interposed between liquid crystal layer 52 and polarizer 154C. Layer 132 may include layer 132A (e.g., a layer in which some or all of the pixels contain quantum dots) and layer 132B (e.g., a layer with color filter material). Light-blocking matrix 152 may be a reflective matrix formed from metal or may be formed from an opaque material such as black polymer.

Layer 58 may include a clear substrate such as substrate 160. Upper polarizer 60 may be formed on the outer surface of substrate 160. Thin-film transistor circuitry 158 (e.g., electrodes and transistors for pixel circuits in the array of pixels in display 14) may be formed on the inner surface of substrate 160. A light-blocking matrix such as matrix 152T may be formed from an opaque material in layer 158 to help block stray light from adjacent pixels. Matrix 152T may be aligned with matrix 152 in layer 56. Liquid crystal alignment layer 156 may be interposed between thin-film transistor circuitry layer 158 and liquid crystal layer 52.

As with the illustrative arrangement for display 14 of FIG. 17, display 14 of FIG. 18 may use either blue or ultraviolet light 44 as pump light for quantum dots in layer 132. Filter layer 164 may be configured to pass the pump light while reflecting light at other wavelengths (e.g., red and green light produced by red and green quantum dots when the pump light is blue or red, green, and blue light produced by red, green, and blue quantum dots when the pump light is ultraviolet).

Red pixels 22R may each include a red quantum dot element 136R in layer 132A and a red color filter element 150R in layer 132B. Green pixels 22G may each include a green quantum dot element 136G in layer 132A and a red color filter element 150G in layer 132B. Blue pixels 22B may be configured appropriately for the type of pump light being produced by light source 42L.

With a first illustrative configuration for display 14 of FIG. 18, light source 42L is configured to produce ultraviolet pump light 44. In this configuration, blue pixels 22B may contain blue quantum dot elements (elements 136B) in layer 132A that produce blue light when pumped with ultraviolet light and may contain blue color filter elements (elements 150B) in layer 132B. Filter layer 164 in this configuration may be an ultraviolet pass filter that passes ultraviolet pump light 44 while reflecting red, green and blue light to enhance output efficiency. Filter layer 164 may be a thin-film interference filter or may be a cholesteric liquid crystal filter (as examples). To help reduce the output of unconverted ultraviolet light from the front of display 14, an ultraviolet-light cut filter material may be incorporated into the elements of layer 132B and/or may be interposed at other locations between layer 132A and the front of display 14 (e.g., an ultraviolet cut filter may be interposed between layers 132A and 132B, may be interposed between layer 132B and polarizer 154C, etc.).

With a second illustrative configuration for display 14 of FIG. 18, light source 42L is configured to produce blue pump light 44. In this configuration, blue pixels 22B may contain light-diffusing material in elements 134B (e.g., elements 134B may be diffuser elements) to diffuse blue pump light so that the angular distribution of output light in the blue pixels matches that of the red and green light being emitted from the quantum dots in the red and green pixels. Blue pixels 22B may also contain, if desired, clear polymer in elements 150B or blue color filter material in elements 150B. Filter layer 164 in this configuration may be a blue light pass filter that reflects red and green light to enhance the output efficiency of the red and green pixels. If desired, elements 150R and 150G may be formed from yellow color filter material (e.g., instead of red and green color filter material) to absorb residual (unconverted) blue pump light and thereby ensure that the red and green pixels do not appear too bluish in color.

Figure 19:
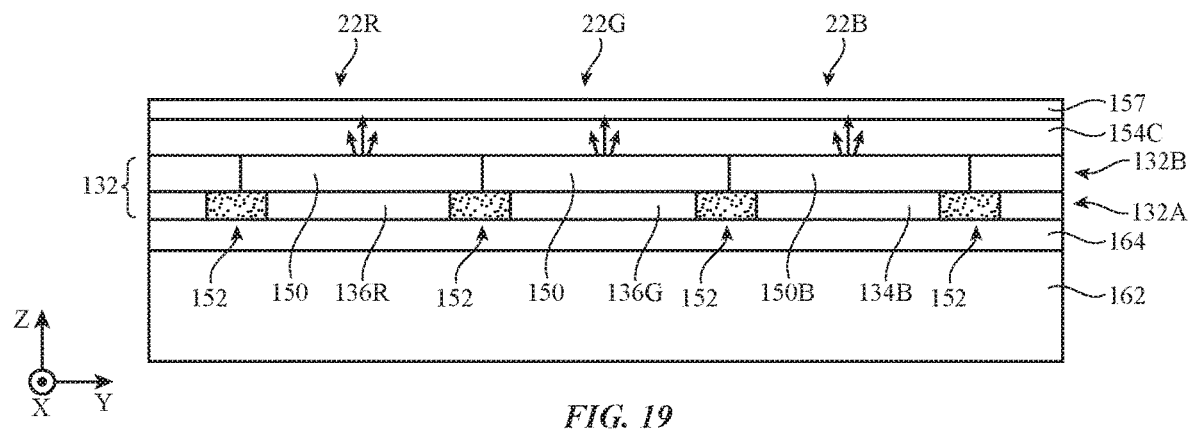
FIGS. 19, 20, and 21 show illustrative color filter and quantum dot configurations for displays in accordance with embodiments.
Figure 20:
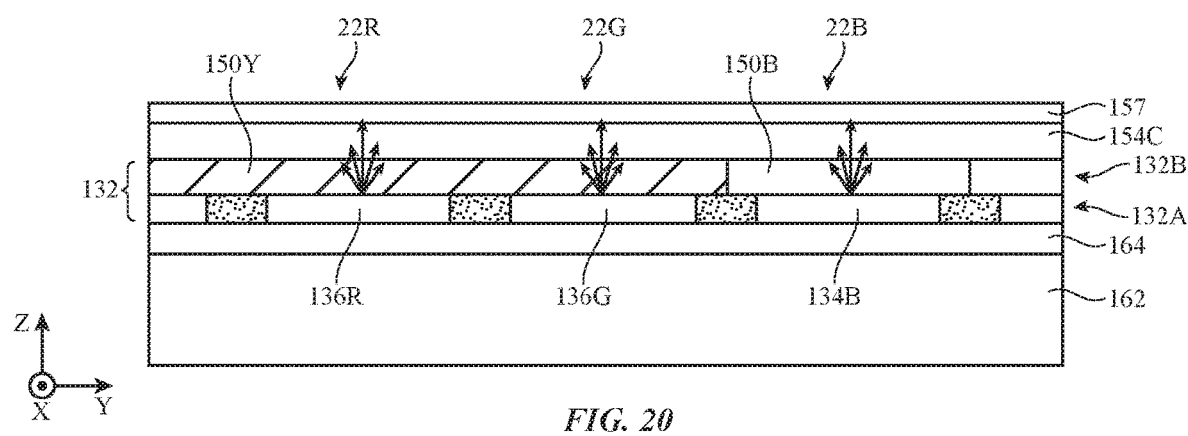
Figure 21:
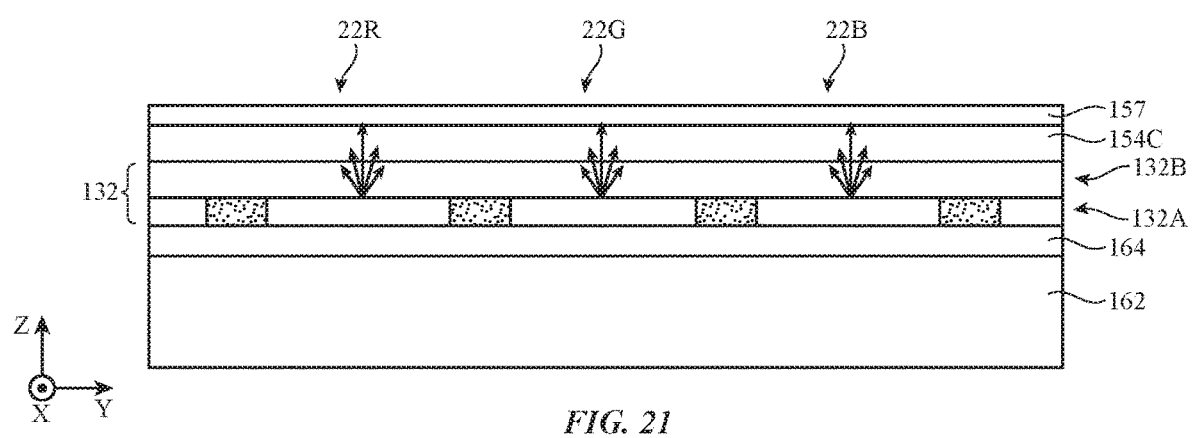

Illustrative configurations for the colored pixel elements and filtering layers of display 14 are shown in FIGS. 19, 20, and 21. In FIGS. 19, 20, and 21, layers 132 are shown as being incorporated into the lower display layers of an inverted display of the type shown in FIG. 18. If desired, layers 132 of FIGS. 19, 20, and 21 may be used in non-inverted configurations for display 14 such as the configuration for display 14 of FIG. 17.

As shown in FIG. 19, matrix 152 may have openings that receive elements 136R, 136G, and 134B. Matrix 152 of FIG. 17 laterally separates filter elements 150R, 150G, and 150B, whereas matrix 152 of FIG. 19 laterally separates only elements 136R, 136G, and 134B.

FIG. 20 shows how yellow color filter material such as filter element 150Y may be used in place of individual red and green filter elements. Yellow elements 150Y may overlap red quantum dot element 136R and green quantum dot element 136G and may be used as a blue cut filter to absorb unconverted blue pump light 44. Element 150B in the arrangement of FIG. 20 may be formed from clear polymer (as an example).

FIG. 21 shows how a blanket (global) filter layer such as an ultraviolet cut filter layer that overlaps pixels of all colors (22R, 22G, 22B) may be used in forming layer 132B. Layer 132B of FIG. 21 may be formed from a thin-film interference filter or a cholesteric liquid crystal filter (as examples).

In general, any suitable pixel configuration may be used for display 14 (pixelated red, green, and blue color filters, a yellow color filter structure for red and green pixels and clear structure for blue pixels, a ultraviolet cut filter when light 44 is ultraviolet light, and/or other suitable pixel arrangements) and these pixel configurations may be used for inverted displays (see, e.g., display 14 of FIG. 18) and for non-inverted displays (see, e.g., display 14 of FIG. 17).

If desired quantum dots in layer 132 may be replaced by other photoluminescent structures such as quantum rods. The polarization of light emitted by the quantum rods may be oriented along the lengths of the quantum rods, so quantum rod configurations for display 14 may, if desired, use quantum rods that are aligned with the pass axis of a corresponding polarizer (e.g., an in-cell polarizer) in display 14. Quantum dots and/or quantum rods may be formed from CdSe nanostructures and/or nanostructures of other suitable materials.

Figure 22:
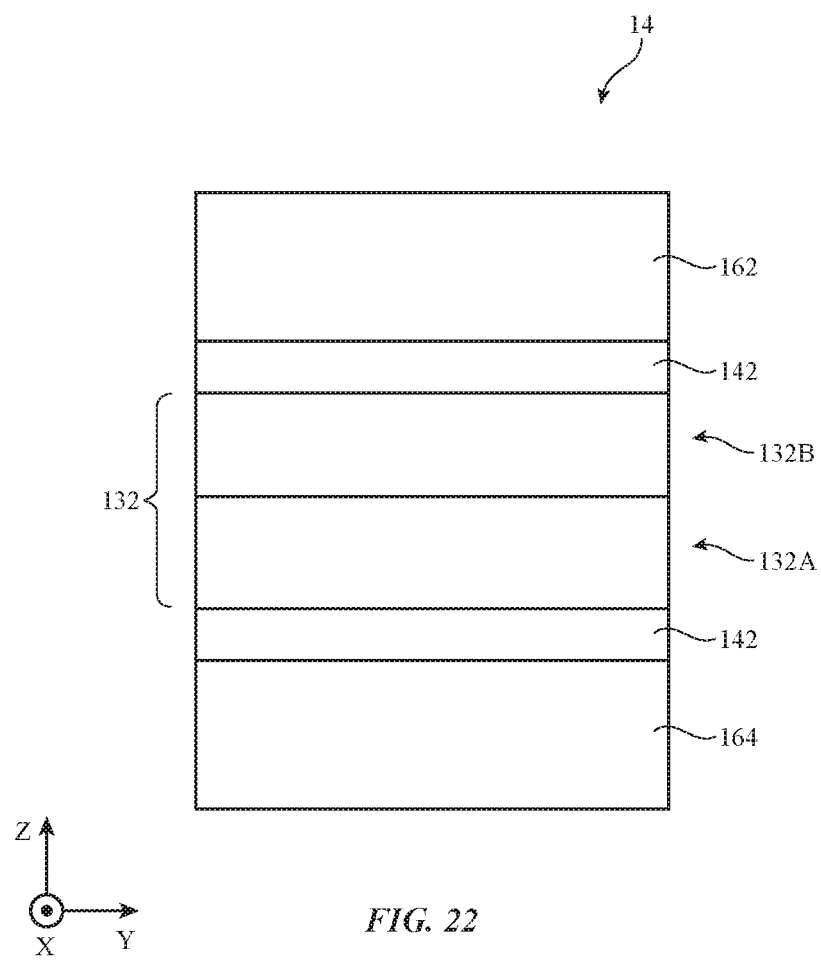
FIGS. 22, 23, and 24 show illustrative locations for low-index-of-refraction layers in a display to help enhance light recycling in accordance with embodiments.

As described in connection with FIG. 14, it may be desirable to incorporate a low-index layer such as layer 142 between layer 132 and adjacent higher index layers (e.g., layer 130). In the example of FIG. 22, low-index layer 142 has been incorporated between layer 162 and layer 132 in an arrangement in which layer 132 includes layer 132A and layer 132B. Layers 132A and/or 132B and/or layer 162 may have refractive indices higher than the refractive index of low-index layer 142. Layer 132A may include red, green, and blue quantum dot elements or may include red and green quantum dot elements and diffuser elements for blue pixels. Layer 132B may include red or yellow color filter elements for red pixels, green or yellow color filter elements for green pixels, and clear elements for blue pixels. A low index layer (layer 142) may also be incorporated between filter layer 164 and layer 132 and may have a lower refractive index than layer 164 and/or layer 132. With configuration such as these, the presence of layer(s) 142 will help create light reflections for off-axis light leaving layer 132. These light reflections will help recycle light in layer 132 (e.g., in quantum dots in layer 132A) without undesired lateral light spreading and will therefore help enhance display efficiency without creating crosstalk between pixels. If desired, layer 132B may be a diffuser layer (e.g., in an configuration with color filter elements and/or in a configuration without color filter elements).

Figure 23:
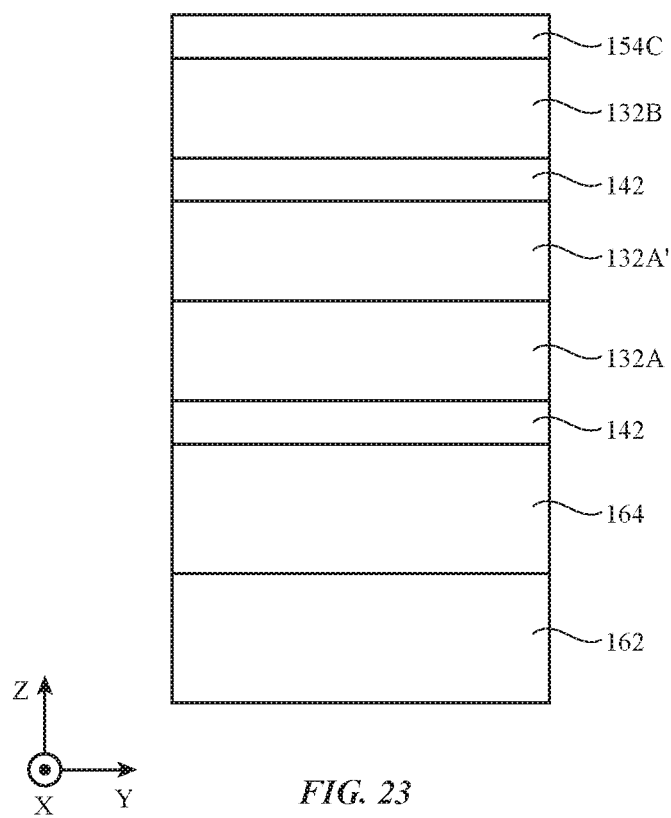

The cross-sectional side view of FIG. 23 shows another illustrative configuration for incorporating low-index layers 142 into display 14. In the arrangement of FIG. 23, layer 132A is covered with an optional diffuser layer such as layer 132A' (e.g., a layer with light-scattering structures to help diffuse light, etc.). Layer 132B may include color filter elements. Filter 164 may be supported on a substrate such as substrate 162. Polarizer 154C may be, for example, an in-cell polarizer. Low-index layers 142 may be interposed between layer 132B and layer 132A' and between layer 132A and filter 166 (as an example) and may have a lower index of refraction than these adjacent layers to help improve quantum dot light recycling. Arrangements of the type shown in FIG. 23 may be used in inverted displays of the type shown in FIG. 18 (as an example).

Figure 24:
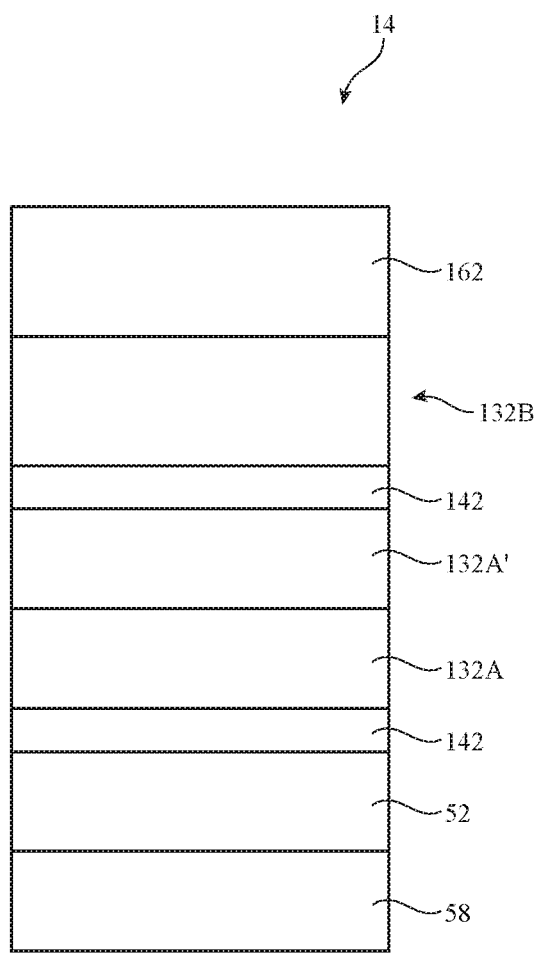

In the illustrative arrangement of FIG. 24, substrate 162 is located above layers 132A and 132 (e.g., as in non-inverted configurations of the type shown in FIG. 17). Layer 132B (e.g. a layer with color filter elements) has been formed on the inner surface of substrate 162. Layer 132A (e.g., a quantum dot layer) may be covered with optional diffuser layer 132A'. Liquid crystal layer 52 may be interposed between layer 132A and thin-film transistor layer 58. To enhance light recycling for off-axis light rays emitted from quantum dot layer 132A, low-index layers 142 may be incorporated into display 14 at locations such as an upper location between layer 132B and layer 132A' and a lower location such as between layer 132A and layer 52.

The foregoing is merely illustrative and various modifications can be made to the described embodiments. The foregoing embodiments may be implemented individually or in any combination.

What is claimed is:

1. A display, comprising:
a light source configured to produce pump light, wherein the light source comprises an array of cells each of which includes a light-emitting device;
display layers that form an array of pixels configured to display images in response to the pump light, wherein the display layers include a first layer having at least first quantum dot elements of a first color and second quantum dot elements of a second color, a second layer having at least first color filter elements of the first color that overlap the first quantum dot elements and second color filter elements of the second color that overlap the second quantum dot elements, a first substrate layer, and a second substrate layer; and a filter layer interposed between the first layer and the light source, wherein the filter layer is configured to reflect light of the first and second colors and pass the pump light and wherein each cell in the array of cells includes a transparent layer with gratings that diffract light from the light-emitting device of that cell through the first substrate layer.

2. The display defined in claim 1 wherein the display layers comprise:

a liquid crystal layer interposed between the first and second substrate layers, wherein the second layer is interposed between the liquid crystal layer and the second substrate layer.

3. The display defined in claim 2 wherein the first substrate layer is interposed between the first layer and the light source.

4. The display defined in claim 1 wherein the light-emitting device of each cell is a light-emitting diode configured to exhibit destructive interference in a direction perpendicular to the transparent layer and configured to exhibit constructive interference in a direction that is not perpendicular to the transparent layer.

5. The display defined in claim 1 wherein the gratings include at least first and second gratings with different respective rotational orientations.

6. The display defined in claim 1 wherein the light-emitting device of each cell includes a light-emitting diode with a first index of refraction and wherein the transparent layer has a second index of refraction that is within 10% of the first index of refraction.

7. The display defined in claim 1 wherein the transparent layer includes openings and reflective material in the openings.

8. The display defined in claim 2 wherein the filter layer is interposed between the first substrate layer and the first layer and is formed from at least one material with a refractive index of at least 1.4 and wherein the display further comprises a layer of material between the filter layer and the first layer having an index of refraction of less than 1.3.

9. The display defined in claim 2 wherein the first layer has a first refractive index and wherein the display layers comprise a layer interposed between the first and second layers with a second refractive index that is lower than the first refractive index.

10. The display defined in claim 2 wherein the first layer comprises a matrix of light-blocking material with openings that receive the first and second quantum dot elements.

11. The display defined in claim 10 wherein the light-blocking material comprises metal.

12. The display defined in claim 1 wherein the light source includes blue light-emitting diodes that are configured to produce blue pump light and wherein the first layer includes diffuser elements associated with blue pixels.

13. The display defined in claim 1 wherein the light source includes ultraviolet light-emitting diodes that are configured to produce ultraviolet pump light and wherein the first layer includes blue quantum dot elements that produce blue light in response to receiving the ultraviolet pump light.

14. The display defined in claim 1 wherein the display layers comprise:

a liquid crystal layer interposed between the first and second substrate layers.

15. A display, comprising:

a light source configured to produce pump light;

display layers that form an array of pixels configured to display images in response to the pump light, wherein the display layers include:

a first layer having at least first quantum dot elements of a first color and second quantum dot elements of a second color;

a second layer having at least first color filter elements of the first color that overlap the first quantum dot elements and second color filter elements of the second color that overlap the second quantum dot elements;

a first substrate layer; and a second substrate layer, wherein the second layer is interposed between the first substrate layer and the second substrate layer; and a filter layer interposed between the first layer and the light source, wherein the filter layer is configured to reflect light of the first and second colors and pass the pump light and wherein the second substrate layer has a portion with recesses.

16. The display defined in claim 15 wherein the second substrate comprises a transparent material with a refractive index and wherein the recesses are patterned to reduce the refractive index of the second substrate in the portion of the second substrate facing the second layer.

17. The display defined in claim 16 wherein the display layers further comprise a glass layer adjacent to the recesses, wherein the glass layer is interposed between the second substrate layer and the second layer.

18. The display defined in claim 15, wherein the display layers include a liquid crystal layer interposed between the first and second substrate layers and wherein the second layer is interposed between the liquid crystal layer and the second substrate layer.

19. A display, comprising:

a light source that produces pump light;

display layers that form an array of pixels configured to display images in response to the pump light, wherein the display layers include a first layer having at least red and green quantum dot elements and a second layer having at least red color filter elements that overlap the red quantum dot elements in red pixels of the array of pixels and green color filter elements that overlap the green quantum dot elements in green pixels of the array of pixels, wherein the first layer includes a metal matrix having openings that receive at least the red and green quantum dot elements, and wherein the red and green quantum dot elements of the first layer have a first index of refraction;

a filter layer interposed between the first layer and the light source that reflects at least red and green light and that passes the pump light; and a layer of material between the first layer and the filter layer that has a second index of refraction that is less than the first index of refraction.

20. The display defined in claim 19, further comprising:

an additional layer of material between the first layer and the second layer, wherein the additional layer of material has a third index of refraction that is less than the first index of refraction.

* * * * *